United States Patent [19]

Matsubara et al.

[11] Patent Number: 5,480,363
[45] Date of Patent: Jan. 2, 1996

[54] APPARATUS FOR CONTROLLING SLIP OF LOCK-UP CLUTCH ON MOTOR VEHICLE DURING DECELERATION OF THE VEHICLE

[75] Inventors: Toru Matsubara; Kunihiro Iwatsuki, both of Toyota, Japan

[73] Assignee: Toyota Jidosha Kabushiki Kaisha, Toyota, Japan

[21] Appl. No.: 301,771

[22] Filed: Sep. 7, 1994

[30] Foreign Application Priority Data

Oct. 6, 1993 [JP] Japan ................................. 5-250321

[51] Int. Cl.$^6$ ............................................. F16H 61/14
[52] U.S. Cl. ............................. 477/63; 477/65; 477/80
[58] Field of Search ................................. 477/63, 65, 80

[56] References Cited

U.S. PATENT DOCUMENTS

| | | | |
|---|---|---|---|
| 5,010,990 | 4/1991 | Yoshimura et al. | 477/63 X |
| 5,115,896 | 5/1992 | Noguchi et al. | 477/65 |
| 5,265,499 | 10/1993 | Soka et al. | 477/63 |

Primary Examiner—Charles A. Marmor
Assistant Examiner—Nathan O. Jensen
Attorney, Agent, or Firm—Oblon, Spivak, McClelland, Maier & Neustadt

[57] ABSTRACT

An apparatus for controlling a lock-up clutch disposed between an engine and an automatic transmission of a motor vehicle, including a slip control device for controlling a slip control pressure to be applied to the lock-up clutch to control the amount of slip of the lock-up clutch, a shift detector for detecting a shifting action of the transmission during deceleration of the vehicle, and a pressure changing device which commands the slip control device, upon detection of a shifting action of the transmission during vehicle deceleration, to change the slip control pressure a predetermined time prior to completion of the shifting action, for reducing an engaging force of the lock-up clutch to a value lower than a value corresponding to the amount of slip of the lock-up clutch established when the transmission is not in the process of a shifting action, to reduce the shifting shock of the transmission.

13 Claims, 16 Drawing Sheets

FIG. 2

| SHIFT LEVER / TRANSMISSION POSITIONS | | SOLENOID VALVES 46 | SOLENOID VALVES 48 | C1 | C2 | B1 | B2 | F1 | B3 | F2 | C0 | F0 | B0 |
|---|---|---|---|---|---|---|---|---|---|---|---|---|---|
| P | | = | = | | | | | | | | | | |
| R | | = | = | | ○ | | | | | | ○ | | |
| N | | = | = | | | | | | | | ○ | | |
| D | 1st | ○ | X | ○ | | | | | | ○ | ○ | ○ | |
| D | 2nd | ○ | ○ | ○ | | | | | ○ | | ○ | ○ | |
| D | 3rd | X | ○ | ○ | | | ○ | | | ○ | ○ | ○ | |
| D | O/D | X | X | ○ | ○ | | ○ | | | | | ○ | ○ |
| S | 1st | ○ | X | ○ | | | | | | ○ | ○ | | |
| S | 2nd | ○ | ○ | ○ | | ○ | | ○ | | | ○ | ○ | |
| S | 3rd | X | ○ | ○ | | | ○ | | | ○ | ○ | ○ | |
| S | (O/D) | X | X | ○ | ○ | | ○ | | | | | ○ | ○ |
| L | 1st | ○ | X | ○ | | | | | | ○ | ○ | | |
| L | 2nd | ○ | ○ | ○ | | ○ | ○ | ○ | ○ | ○ | ○ | ○ | |

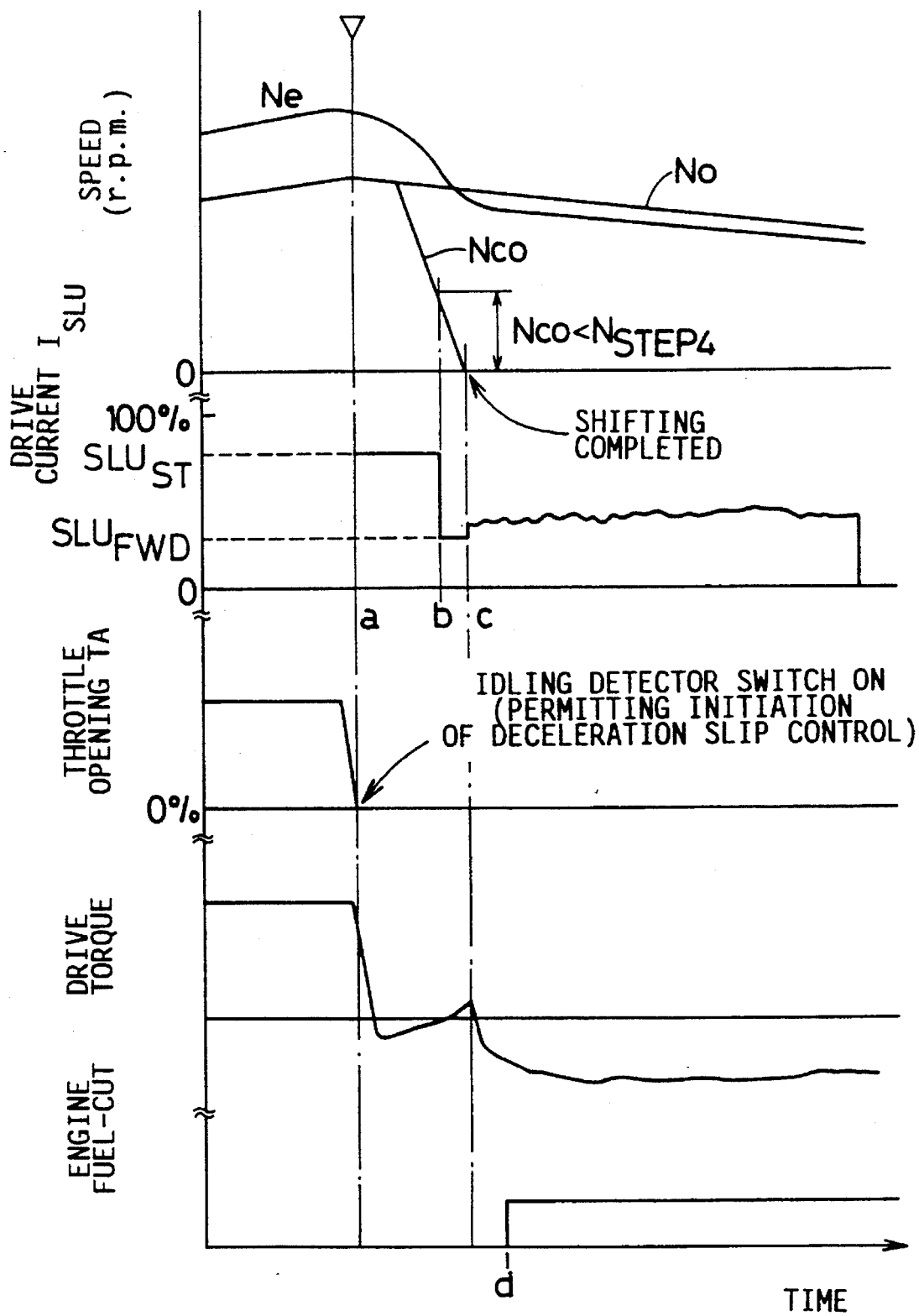

APPARATUS FOR CONTROLLING SLIP OF LOCK-UP CLUTCH ON MOTOR VEHICLE DURING DECELERATION OF THE VEHICLE

BACKGROUND OF THE INVENTION

1. Field of the Invention

The present invention relates to an apparatus for controlling the amount of slip of a lock-up clutch disposed between an engine and an automatic transmission of a motor vehicle.

2. Discussion of the Related Art

Some motor vehicles are equipped with a torque converter or fluid coupling which is disposed between an engine and an automatic transmission and which is provided with a lock-up clutch for direct connection of the engine and the automatic transmission. In this type of motor vehicle, the amount of slip of the lock-up clutch is controlled to an optimum value by suitable slip control means during deceleration of the vehicle, for the purpose of controlling the engine in a so-called "fuel cut" mode for a prolonged period of time to improve the fuel economy. For example, the engine is controlled in the fuel cut mode when the vehicle is coasting with the accelerator pedal placed in its non-operated position. In the fuel cut mode, a fuel supply to the engine is cut as long as the engine speed is higher than a predetermined fuel-cut speed, and the lock-up clutch is partially engaged with the slip amount being optimally controlled by a slip control device as disclosed in JP-A-1-279157.

This slip control device disclosed in the publication identified above is adapted to control a slip control hydraulic pressure to be applied to the lock-up clutch to regulate an engaging force of the lock-up clutch. When a change of the operating state of the vehicle which will cause subsequent deceleration of the vehicle is detected, the slip control device increases the slip control pressure to a relatively high level that produces a larger engagement force of the lock-up clutch during deceleration of the vehicle, than in a steady or stable running state of the vehicle at a substantially constant speed. The slip control pressure is held at that relatively high level for a given period of time to permit initiation of partial engagement of the lock-up clutch before the amount of slip of the lock-up clutch is controlled while the engine is controlled in the fuel cut mode.

When the operating state of the vehicle is changed leading to deceleration of the vehicle, for instance, when the accelerator pedal is released, the automatic transmission may be shifted from one position to another. Since the hydraulic pressure is being applied to the lock-up clutch for partial engagement thereof by the slip control device, the automatic transmission tends to suffer from a relatively large shifting shock, which is undesirable for smooth, comfortable running of the vehicle during coasting or deceleration of the vehicle.

SUMMARY OF THE INVENTION

It is therefore an object of the present invention to provide an apparatus for controlling the amount of slip of the lock-up clutch of a motor vehicle, which assures a reduced amount of shifting shock of the automatic transmission upon shifting thereof in response to a change of the operating state or condition of the vehicle that will cause subsequent deceleration of the vehicle.

The above object may be achieved according to the principle of the present invention, which provides an apparatus for controlling an amount of slip of a lock-up clutch disposed between an engine and an automatic transmission of a motor vehicle for direct connection of the engine and the transmission, comprising: (a) slip control means for controlling a slip control pressure to be applied to the lock-up clutch such that the amount of slip of the lock-up clutch is held within a predetermined range while the vehicle is decelerating; (b) shift detecting means for detecting that the automatic transmission is in the process of a shifting action during deceleration of the vehicle; and (c) pressure changing means responsive to detection of a shifting action of the transmission by the shift detecting means, for commanding the slip control means to change the slip control pressure a predetermined time prior to completion of the shifting action, for reducing an engaging force of the lock-up clutch to a first value lower than a second value corresponding to the amount of slip of the lock-up clutch established by the slip control means when the transmission is not in the process of a shifting action, whereby a shifting shock of the transmission is reduced by the reduced engaging force of the lock-up clutch.

In the lock-up clutch slip control apparatus of the present invention constructed as described above, the pressure changing means is activated upon detection of a shifting action of the transmission during the vehicle deceleration detected by the shift detecting means, to command the slip control means to change the slip control pressure, so that the engaging force of the lock-up clutch is reduced to the value lower than the value established by the amount of slip controlled by the slip control means while the transmission is not in the process of a shifting action.

According to the above arrangement, the shifting shock of the transmission upon completion of the shifting action during the vehicle deceleration is significantly reduced owing to the reduction of the engaging force of the lock-up clutch for a given period of time which precedes the completion of the shifting action.

The slip control means may include a linear solenoid valve having a solenoid coil and generating the slip control pressure such that the slip control pressure changes with a drive current applied to the coil. In this case, the pressure changing means may include means for changing the drive current applied to the coil of the linear solenoid valve, to change the slip control pressure to reduce the engaging force of the lock-up clutch.

The pressure changing means may be adapted to command the slip control means to hold the slip control pressure at a level corresponding to the first value of the engaging force of the lock-up clutch, for a predetermined period of time which precedes the completion of the shifting action of the transmission.

The apparatus according to the above arrangement may further comprise deceleration detecting means for detecting deceleration of the vehicle. In this instance, the pressure changing means may be adapted to command the slip control means upon detection of the deceleration of the vehicle, to hold the slip control pressure at a predetermined level so that the engaging force of the lock-up clutch is held at a third value higher than the first and second values. The pressure changing means may be adapted to command the slip control means to change the slip control pressure to reduce the engaging force of the lock-up clutch from the third value to the first value. For example, the deceleration detecting means detects deceleration of the vehicle when a currently detected load acting on the engine is substantially zero while the vehicle is running. The currently detected engine load may be detected by detecting a movement of an accelerator pedal from an operated position to a non-operated position thereof.

According to a preferred arrangement of the present invention, the apparatus may further comprise: monitoring means for monitoring a variation in an output speed of the automatic transmission after completion of the shifting action; and adjusting means for adjusting, on the basis of the variation monitored by the monitoring means, at least one parameter associated with a level of the slip control pressure which corresponds to the first value of the engaging force of the lock-up clutch. In this case, the parameter or parameters may be selected from the group consisting of: the level of the slip control pressure corresponding to the first value of the engaging force of the lock-up clutch; a point of time at which the slip control pressure is changed to the level corresponding to the first value of the engaging force; and a time duration for which the slip control pressure is held at the level corresponding to the first value of the engaging force.

The monitoring means may be adapted to detect an amplitude of pulsations of a wave representative of a variation in the output speed of the transmission, and/or a frequency of pulsations of a wave representative of a variation in the output speed of the transmission.

Usually, the automatic transmission is shifted on the basis of a currently detected load of the engine and a running speed of the vehicle, and the slip control means is operated to control the amount of slip of the lock-up clutch when the currently detected load and the running speed fall within a predetermined region in which the lock-up clutch should be controlled for partial engagement in a slip control mode.

BRIEF DESCRIPTION OF THE DRAWINGS

The above and other objects, features and advantages of the present invention will be better understood by reading the following detailed description of presently preferred embodiments of the invention, when considered in connection with the accompanying drawings, in which:

FIG. 2 is a view indicating a relationship between operating positions of the automatic transmission of FIG. 1 and combinations of operating states of frictional coupling devices of the transmission and solenoid-operated valves;

FIG. 11 is a time chart explaining the operation of the electronic control device;

DETAILED DESCRIPTION OF THE PREFERRED EMBODIMENTS

Figure 1:
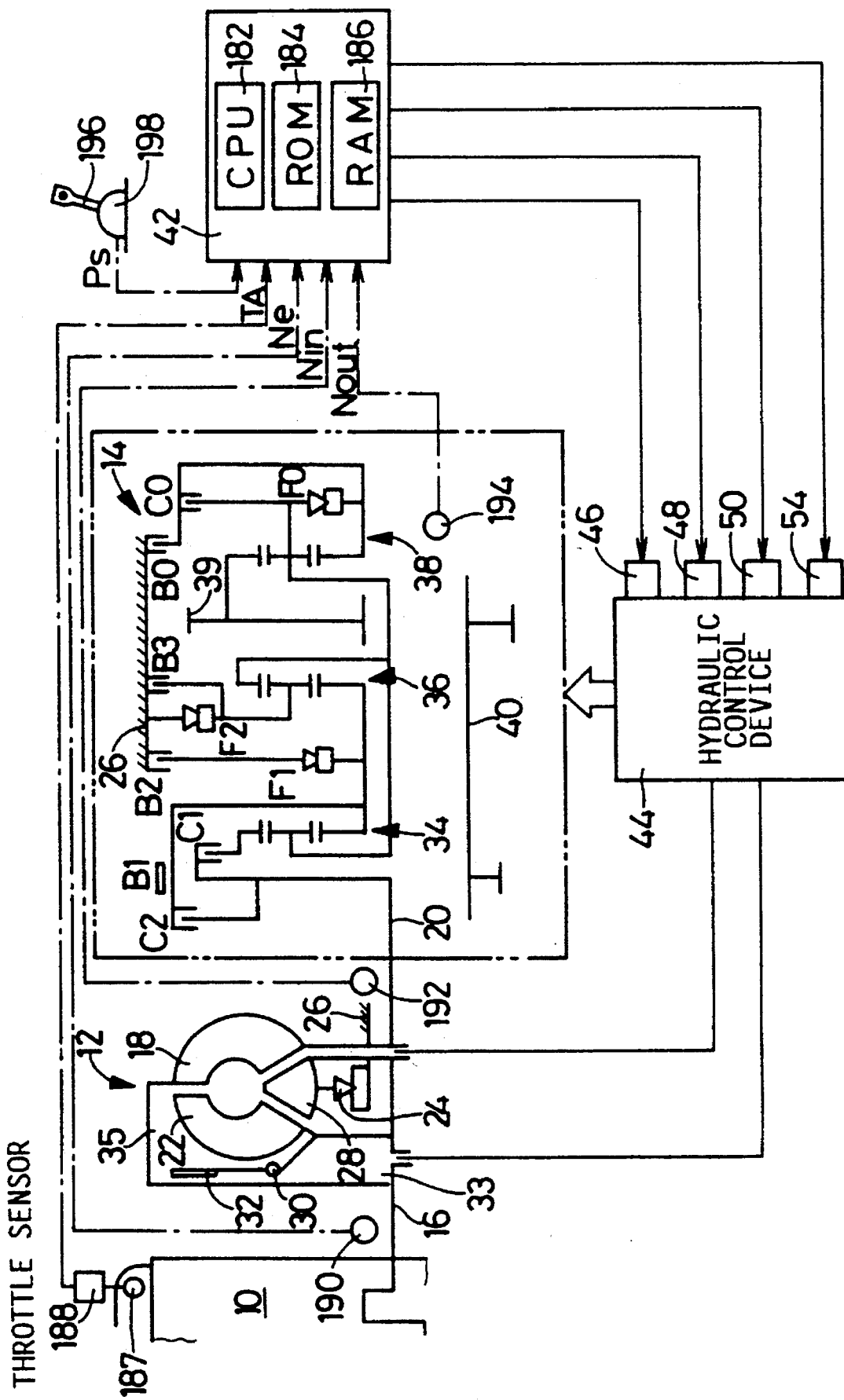
FIG. 1 is a schematic view illustrating an automatic power transmitting system of a motor vehicle, and a control system for the power transmitting system, which incorporates an apparatus constructed according to one embodiment of this invention for controlling the amount of slip of a lock-up clutch disposed between an engine and an automatic transmission of the vehicle.

Referring first to FIG. 1, there is shown a power transmitting system of a motor vehicle incorporating one embodiment of a lock-up clutch control apparatus of the invention. The power transmitting system includes a torque converter 12 and an automatic transmission 14. The torque converter 12 is connected to an engine 10 and equipped with a lock-up clutch 32. The automatic transmission 14, which is connected to the torque converter 12, includes three planetary gear units 34, 36, 38. Power of the engine 10 is transmitted to the drive wheels of the vehicle through the torque converter 12, automatic transmission 14 and a differential gear device well known in the art.

The torque converter 12 includes: a pump impeller 18 connected to a crankshaft 16 of the engine 10; a turbine impeller 22 connected to an input shaft 20 of the automatic transmission 14 and rotated by the pump impeller 18 via a working fluid; and a stator 28 fixed to a stationary member in the form of a housing 26 via a one-way clutch 24; the lock-up clutch 32 (indicated above) connected to the input shaft 20 via a damper 30. The torque converter 12 has a releasing chamber 33 and an engaging chamber 35, for operating the lock-up clutch 32. When the pressure of the fluid in the releasing chamber 33 is made higher than that in the engaging chamber 35, the lock-up clutch 32 is brought to its fully released state, whereby a torque received from the engine 10 is boosted at a ratio proportional to the ratio of the input speed to the output speed of the torque converter 12. When the pressure in the engaging chamber 35 is made higher than that in the releasing chamber 33, the lock-up clutch 32 is brought to its fully engaged state, whereby the input and output members of the torque converter 12 are directly connected to each other, that is, the crankshaft 16 is directly connected to the input shaft 20 of the automatic transmission 14.

The first, second and third planetary gear devices 34, 36, 38 of the automatic transmission 14 are disposed coaxially with each other, and the third planetary gear device 38 has an output gear 39 rotating with a ring gear. The automatic transmission 14 further has an output shaft in the form of a countershaft 40 connected to the output gear 39, so that power is transmitted by the countershaft 40 between the output gear 39 and the differential gear device. Some components of the three planetary gear devices 34, 36, 38 are permanently connected to each other, while some of the devices 34, 36, 38 are temporarily and selectively connected to each other through three clutches $C_0$, $C_1$ and $C_2$. Further, four brakes $B_0$, $B_1$, $B_2$ and $B_3$ are provided to temporarily fix selected components of the devices 34, 36, 38 to the housing 26, while three one-way clutches $F_0$, $F_1$ and $F_2$ are provided to connect selected components of the devices 34, 36, 38 to each other or to a housing 26, depending upon the direction of rotation of those components.

The clutches $C_0$, $C_1$, $C_2$ and the brakes $B_0$, $B_1$, $B_2$, $B_3$ are multiple-disk clutches, or band brakes each having a single band or two bands, for example, and are operated by hydraulic actuators that are controlled by an electronic control device 42 through a hydraulic control device 44. With those actuators controlled, the transmission 14 is placed in one of four forward drive positions and a rear drive position, which are indicated as "1st", "2nd", "3rd", "O/D" and "R" in the table of FIG. 2, which will be referred to as "first-speed position", "second-speed position", "third-speed position" "overdrive position" and "rear position", respectively, where appropriate. The four forward speed positions "1st", "2nd", "3rd" and "O/D" have different speed ratios $I = N_{in}/N_{out}$, where $N_{in}$ represents the speed of the input shaft 20 of the transmission 14, while $N_{out}$ represents the speed of the countershaft 40. The speed ratio I of the forward drive positions decreases in the order from the first-speed position "1st" toward the overdrive position "O/D".

The hydraulic control device 44 functions to control both the hydraulic actuators for the automatic transmission 14 and the lock-up clutch 32. For controlling the automatic transmission 14, the hydraulic control device 44 is provided with a first solenoid-operated valve 46 and a second solenoid-operated valve 48, which are opened and closed by energization and de-energization of the appropriate solenoid coils by the electronic control device 42, to place the clutches $C_0$–$C_2$ and brakes $B_0$–$B_3$ of the transmission 14 in the engaged or released state, to thereby establish one of the operating positions of the transmission 14. FIG. 2 indicates a relationship between combinations of the operating states of the coils of the first and second solenoid-operated valves 46, 48 and the operating states of the clutches and brakes. In FIG. 2, "o" marks represent the energization of the solenoid coils or the engaged state of the clutches and brakes, while "x" marks represent the de-energization of the solenoid coils. The clutches and brakes are in the released state where the "o" marks are not provided. The "o" marks represent the engaged state of the one-way clutches $F_1$ and $F_2$ when a torque is transmitted through the transmission 14 from the first planetary gear device 34 toward the third planetary gear device 38 (in the direction from the engine 10 toward the countershaft 40).

Figure 3:
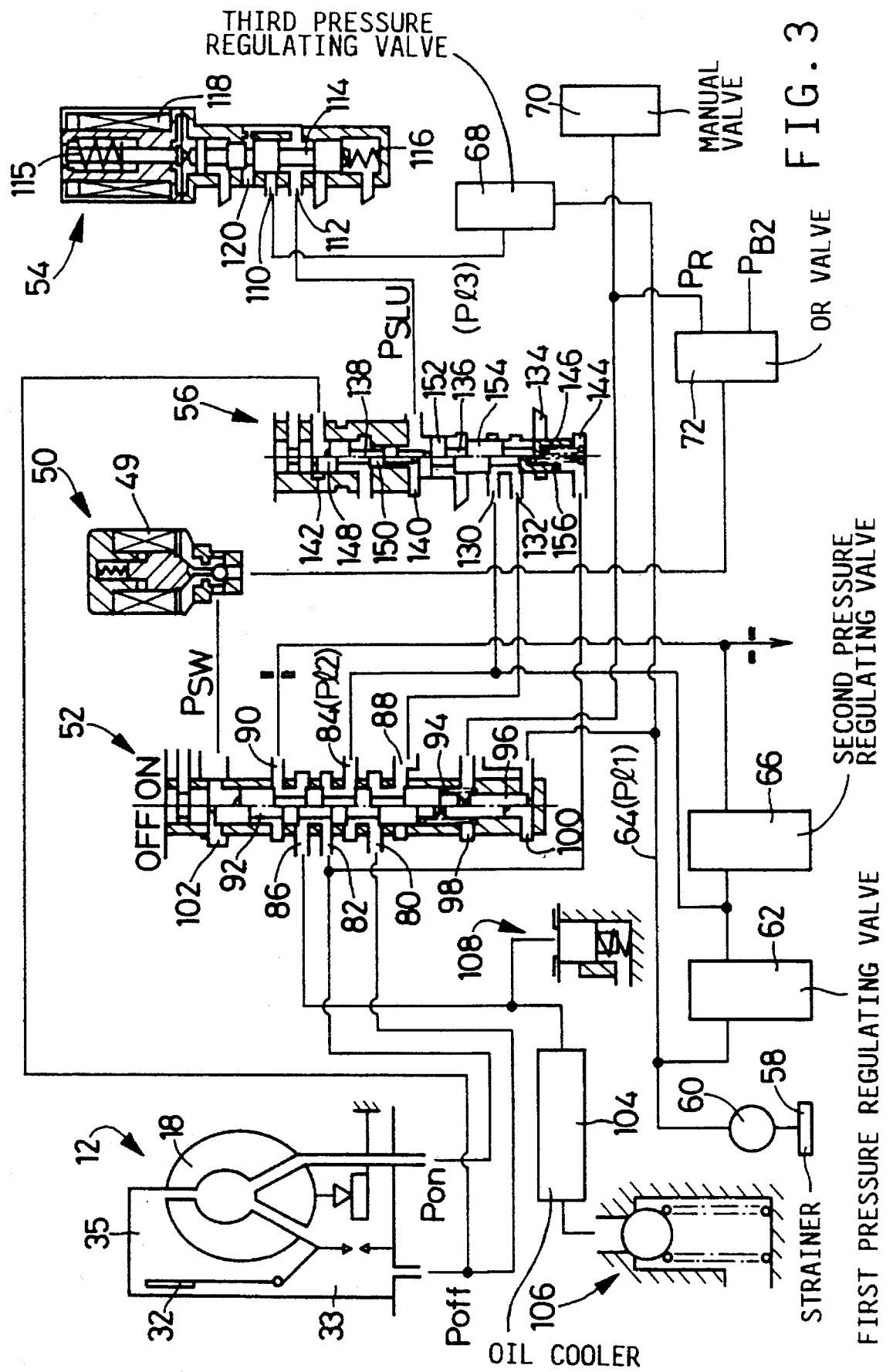
FIG. 3 is a view explaining a portion of a hydraulic control device of the control system of FIG. 1.

The hydraulic control device 44 further has a hydraulic arrangement as shown in FIG. 3 by way of example, for controlling the lock-up clutch 32. Namely, the device 44 also has a third solenoid-operated valve 50, a clutch control valve 52, a linear solenoid valve 54, and a slip control valve 56. The third solenoid-operated valve 50 has a solenoid coil 49 and generates a switching pressure $P_{SW}$ upon energization of the coil 49 by the electronic control device 42. The clutch control valve 52 is operated according to the switching pressure $P_{SW}$ to place the lock-up clutch 32 selectively in its engaged or released state. The linear solenoid valve 50 is activated according to a drive current $I_{SLU}$ received from the electronic control device 42, to generate a slip control pressure $P_{SLU}$ corresponding to the drive current $I_{SLU}$. The slip control valve 56 is operated according to the slip control pressure $P_{SLU}$, to regulate a difference $\Delta P$ between the fluid pressures in the engaging and releasing chambers 35, 33 of the torque converter 12, for controlling the amount of slip of the lock-up clutch 32, that is, the amount of partial engagement of the lock-up clutch 32.

Referring to FIG. 3, the hydraulic control device 44 has a pump 60 as a pressure source, which is adapted to suck the working fluid through a strainer 58 from a reservoir and pressurize the fluid to deliver the pressurized fluid. The pressure of the fluid delivered from the pump 60 is adjusted to a first line pressure $Pl_1$ in a first pressure line 64 by an overflow-type first pressure regulating valve 62. This valve 62 is adapted to receive a throttle pressure from a throttle detector valve (not shown) which detects an opening angle TA of a throttle valve 187 of the engine 10. The first line pressure $Pl_1$ in the first pressure line 64 is regulated by the valve 62 such that the pressure $Pl_1$ increases with the throttle pressure. To the first pressure line 64, there is connected an overflow-type second pressure regulating valve 66 which regulates the pressure of the overflow fluid from the first pressure regulating valve 62, to produce a second line pressure $Pl_2$ which corresponds to the output torque of the engine 10. To the first pressure line 64, there is also connected a third pressure regulating valve 68, which is a pressure reducing valve for lowering the first line pressure $Pl_1$ to a third line pressure $Pl_3$.

A manual valve 70 is adapted to generate a rear-position pressure $P_R$ when a shift lever 196 is placed in a rear position "R". As indicated in FIG. 2, the shift lever 196 has a parking position "P", a neutral position "N", a drive position "D", a second position "S" and a low position "L", in addition to the rear position "R". The rear-position pressure $P_R$ generated by the manual valve 70 is applied to an OR valve 72, which also receives a pressure $P_{B2}$ in the brake $B_2$ which is engaged when the transmission 14 is placed in the second-speed position "2nd". The OR valve 72 generates as an output thereof the higher one of the pressures $P_R$ and $P_{B2}$.

The clutch control valve 52 has: a releasing port 80 communicating with the releasing chamber 33; an engaging port 82 communicating with the engaging chamber 35; an input port 84 adapted to receive the second line pressure $Pl_2$; a first drain port 86 through which the fluid is discharged from the engaging chamber 35 when the lock-up clutch 32 is released; a second drain port 88 through which the fluid is discharged from the releasing chamber 33 when the lock-up clutch 32 is engaged; a supply port 90 adapted to receive a portion of the fluid discharged from the second pressure regulating valve 66 while the lock-up clutch 32 is held in its engaged state; a spool 92 movable for changing connections and disconnection of the ports indicated above; a spring 94 biasing the spool 92 toward its OFF position for releasing the lock-up clutch 32; a plunger 96 abuttable on one of opposite ends of the spool 92 at which the spring 94 is disposed; an oil chamber 98 adapted to receive the rear-position pressure $P_R$ such that this pressure acts on the opposed end faces of the spool 92 and plunger 94; an oil chamber 100 adapted to receive the first line pressure $Pl_1$ such that this pressure acts on the end face of the plunger 96 remote from the spool 92; an oil chamber 102 adapted to receive the switching pressure $P_{SW}$ such that this pressure biases the spool 92 toward its ON position for engaging the lock-up clutch 32.

The third solenoid-operated valve 50 has a ball which is seated on a valve seat to disconnect the oil chamber 102 and the OR valve 72 from each other and to thereby drain the oil chamber 102 when the solenoid coil 49 is in the de-energized or OFF state. When the coil 49 is energized or ON, the ball is unseated to effect communication between the oil chamber 102 and the OR valve 72, so that the switching pressure $P_{SW}$ is applied to the oil chamber 102. When the coil 49 is in the de-energized state, the spool 92 is placed in its OFF position under the biasing force of the spring 94 and a thrust force based on the first line pressure $Pl_1$ applied to the oil chamber 100, without the switching pressure $P_{SW}$ applied to the oil chamber 102. As a result, the input port 84 is brought into communication with the releasing port 80, while the engaging port 82 is brought into communication with the first drain port 86, whereby a pressure $P_{off}$ in the releasing chamber 33 is made higher than a pressure $P_{on}$ in the engaging chamber 35, so that the lock-up clutch 32 is released. In this condition, the fluid in the engaging chamber 35 is discharged through the first drain port 86, an oil cooler 104 and a check valve 106.

When the solenoid coil 49 of the third solenoid-operated valve 50 is de-energized, the switching pressure $P_{SW}$ is applied to the oil chamber 102, and the spool 92 is moved to its ON position against the biasing force of the spring 94 and the thrust force based on the first line pressure $Pl_1$ in the oil chamber 100. As a result, the input port 84 is brought into communication with the engaging port 82, and the releasing port 80 is brought into communication with the second drain port 88, while the supply port 90 is brought into communication with the first drain port 86, whereby the pressure $P_{on}$ in the engaging chamber 35 is made higher than the pressure $P_{off}$ in the releasing chamber 33, so that the lock-up clutch 32 is engaged. In this condition, the fluid in the releasing chamber 33 is discharged through the second drain port 88 and the slip control valve 56.

Figure 4:
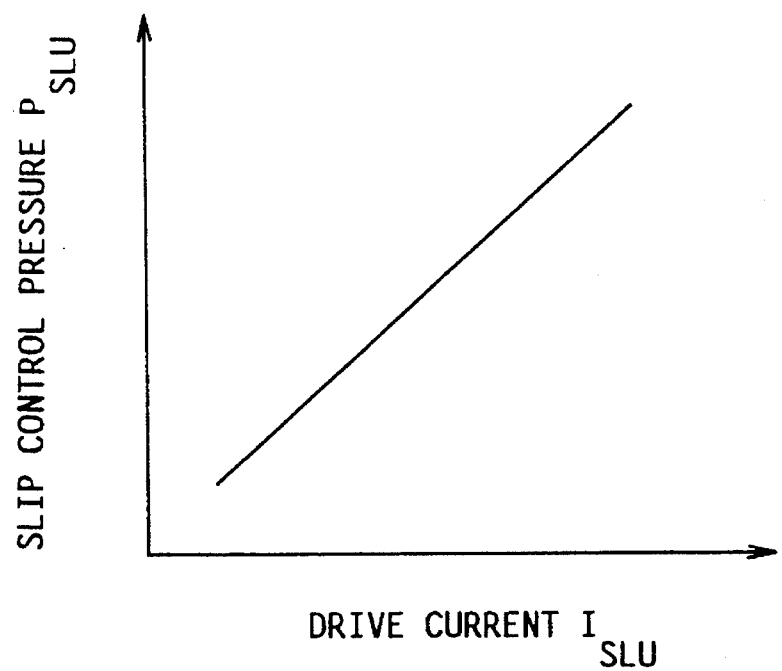
FIG. 4 is a graph indicating a relationship between a slip control pressure $P_{SLU}$ generated by a linear solenoid valve used in the hydraulic control device of FIG. 3 and a drive current $I_{SL}$ applied to the linear solenoid valve.

The linear solenoid valve 54 is a pressure reducing valve for lowering the third line pressure $Pl_3$ generated by the third pressure regulating valve 68. This valve 54 produces the slip control pressure $P_{SLU}$ which linearly increases with an increase in the drive current $I_{SLU}$ applied thereto from the electronic control device 42, as indicated in the graph of FIG. 4. The slip control pressure $P_{SLU}$ is applied to the slip control valve 56. The linear solenoid valve 54 has: a supply port 110 adapted to receive the third line pressure $Pl_3$; an output port 112 through which the slip control pressure $P_{SLU}$ is supplied to the slip control valve 56; a spool 114 for opening and closing those ports; a spring 115 for biasing the spool 114 toward its closed position; a spring 116 for biasing the spool 114 toward its open position, with a biasing force smaller than that produced by the spring 115; a solenoid coil 118 which is energized by the drive current $I_{SLU}$ for biasing the spool 114 toward the open position; and an oil chamber 120 adapted to receive the slip control pressure $P_{SLU}$ as a feedback pressure for biasing the spool 114 toward the closed position. The spool 114 is moved to a position of equilibrium in which the sum of the biasing force of the spring 116 and a thrust force produced by the coil 118 is equal to the sum of the biasing force of the spring 115 and a thrust force based on the feedback pressure $P_{SLU}$.

The slip control valve 56 has: a line pressure port 130 adapted to receive the second line pressure $Pl_2$; an input port 132 adapted to receive the fluid discharged from the releasing chamber 33 through the second drain port 88 of the clutch control valve 52; a drain port 134 through which the fluid received by the input port 132 is discharged; a spool 136 movable between its first and second positions (right and left positions indicated in FIG. 3, respectively); a plunger 138 abuttable on the spool 136, for biasing the spool 136 toward the first position; a pilot pressure chamber 140 adapted to receive the slip control pressure $P_{SLU}$; an oil chamber 142 adapted to receive the pressure $P_{off}$ in the releasing chamber 33, for biasing the spool 132 toward the first position; an oil chamber 144 adapted to receive the pressure $P_{on}$ in the engaging chamber 35, for biasing the spool 132 toward the second position; and a spring 146 accommodated in said oil chamber 140, for biasing the spool 136 toward the second position.

When the spool 132 is placed in the first position, the input port 132 and the drain port 134 are held in communication with each other to discharge the fluid from the releasing chamber 33 and thereby increase the pressure difference $\Delta P = P_{on} - P_{off}$. When the spool 132 is placed in the second position, the input port 132 and the line pressure port 130 are held in communication with each other to apply the second line pressure $Pl_2$ to the releasing chamber 33 and thereby decrease the pressure difference $\Delta P$. The slip control pressure $P_{SLU}$ in the pilot pressure chamber 140 acts on both of the spool 136 and plunger 138, for thereby biasing these spool and plunger 135, 138 in the opposite directions away from each other.

The plunger 138 has a first land 148 having a cross sectional area A1, and a second land 150 having a cross sectional area A2 smaller than the cross sectional area A1. The spool 136 has a third land 152 having a cross sectional area A3, a fourth land 154 having a cross sectional area A4 smaller than A3 and equal to A1, and a fifth land 156 having a cross sectional area A5 equal to A1. The cross sectional areas A1–A5 satisfy the following formula (1):

$$A3 > A1 = A4 = A5 > A2 \qquad (1)$$

In the above arrangement, therefore, the following formula (2) is satisfied when the clutch control valve 52 is placed in the ON position and when the slip control pressure $P_{SLU}$ is relatively low:

$$A1 \cdot P_{off} \geq A2 \cdot P_{SLU} \qquad (2)$$

In the above condition, the plunger 138 is moved with the spool 136, with the plunger 138 held in abutting contact with the spool 132, and the pressure difference $\Delta P$ corresponds to the slip control pressure $P_{SLU}$. The pressure difference $\Delta P$ is expressed by the following formula (3), and changes with the slip control pressure $P_{SLU}$, at a rate of $[(A3 - A2)/A1]$:

$$\Delta P = P_{on} - P_{off} = (A3 - A2)/A1] P_{SLU} - Fs/A1 \qquad (3)$$

where, Fs: biasing force of the spring 146

When the slip control pressure $P_{SLU}$ is raised to a predetermined level $P_A$, the following formula (4) is satisfied:

$$A1 \cdot P_{off} < A2 \cdot P_{SLU} \qquad (4)$$

Figure 5:
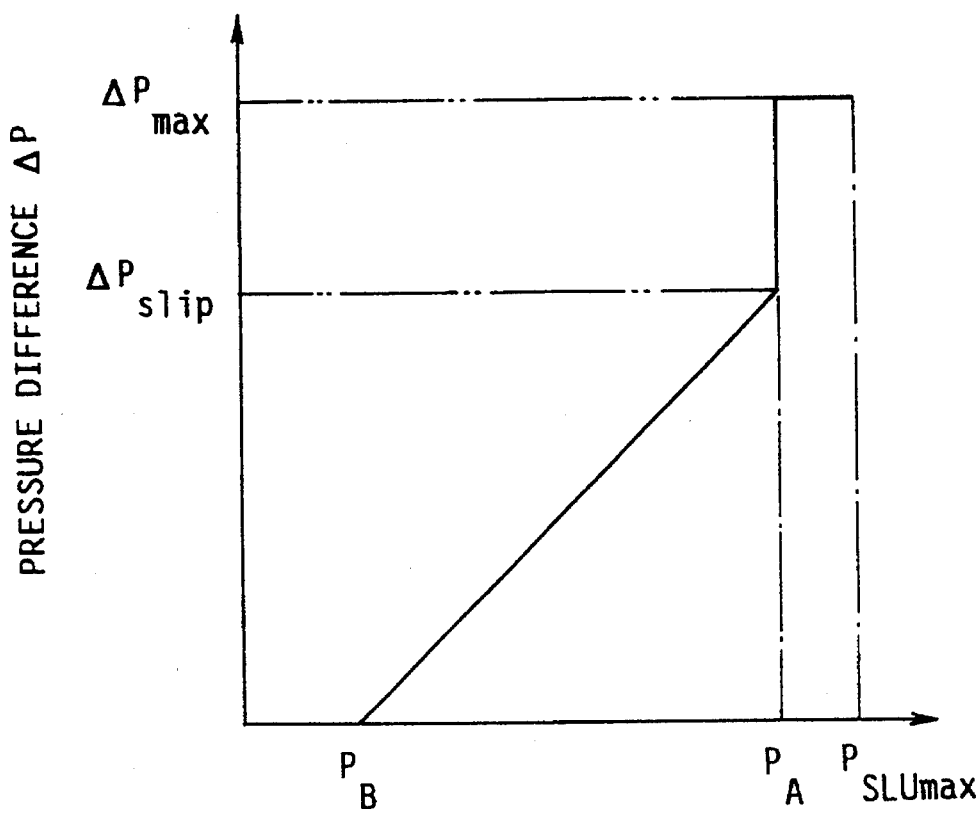
FIG. 5 is a graph indicating a relationship between the slip control pressure $P_{SLU}$ and a difference $\Delta P$ between pressures in engaging and releasing chambers of the lock-up clutch.

As indicated in the graph of FIG. 5, the level $P_A$ corresponds to a predetermined value $\Delta P_{SLIP}$ of the pressure difference $\Delta P$, which is smaller than a maximum value $\Delta P_{max}$ of the difference $\Delta P$ and at which there is a minimum amount of slip of the lock-up clutch 32. The cross sectional areas of the spool 136 and plunger 138 and other factors of the valve 56 are determined so as to satisfy the above formula (4) when the slip control pressure $P_{SLU}$ reaches the level $P_A$. When the formula (4) is satisfied, namely, when the slip control pressure $P_{SLU}$ is raised to or above the predetermined level $P_A$, the plunger 138 and the spool 136 are moved away from each other, and the spool 136 is located at a position at which the following equation (5) is satisfied:

$$A3 \cdot P_{SLU} = A4 \cdot P_{on} + Fs \quad (5)$$

On the other hand, however, the slip control valve 56 is constructed to effect fluid communication between the input port 132 and the drain port 134 when the spool 136 is positioned so as to satisfy the above formula (5). Consequently, the pressure $P_{off}$ in the releasing chamber 33 is further lowered down to the atmospheric pressure after the slip control pressure $P_{SLU}$ exceeds the above-indicated predetermined level $P_A$. Therefore, the pressure difference $\Delta P$ $(=P_{on}-P_{off})$ is made equal to the pressure $P_{on}$, whereby the lock-up clutch 32 is placed in the fully engaged state. Solid line in the graph of FIG. 5 represents a change in the pressure difference $\Delta P$ with the slip control pressure $P_{SLU}$.

When the slip control pressure $P_{SLU}$ is equal to or lower than a predetermined level $P_B$, the following formula (6) is satisfied, and the pressure difference $\Delta P$ is zeroed, as indicated in the graph of FIG. 5:

$$A3 \cdot P_{on} > A3 \cdot P_{SLU} \quad (6)$$

In the above condition, the lock-up clutch 32 is placed in the fully released state, even when the clutch control valve 52 is placed in the ON position.

Referring back to FIG. 1, the electronic control device 42 is constituted by a so-called microcomputer incorporating a CPU (central processing unit) 182, a ROM (read-only memory) 184, a RAM (random-access memory) 186, and input and output interfaces, as well known in the art. The electronic control device 42 receives output signals of various sensors which include: a throttle sensor 188 which detects the opening angle TA of the throttle valve 187 and which is provided with an idling detector switch that is turned ON when the engine 10 is in the idling state; an engine speed sensor 190 which detects a speed Ne of the engine 10 (speed $N_P$ of the pump impeller 18, which is the input speed of the lock-up clutch 32); an input shaft speed sensor 192 which detects a speed $N_{in}$ of the input shaft 20 of the automatic transmission 14 (speed $N_T$ of the turbine impeller 22, which is the output speed of the lock-up clutch 32); a countershaft speed sensor 194 which detects a speed $N_{out}$ of the countershaft 40 of the automatic transmission 14 (hereinafter referred to as "output speed of the transmission 14); and a shift position sensor 198 which detects a currently selected position Ps of the shift lever 196. The CPU 182 of the electronic control device 42 processes those input signals according to control programs stored in the ROM 184, while utilizing a temporary data storage function of the RAM 186, to control the first, second and third solenoid-operated valves 46, 48, 50 and the linear solenoid valve 54, for controlling shifting actions of the automatic transmission 14 and engaging and releasing actions of the lock-up clutch 32.

Figure 6:
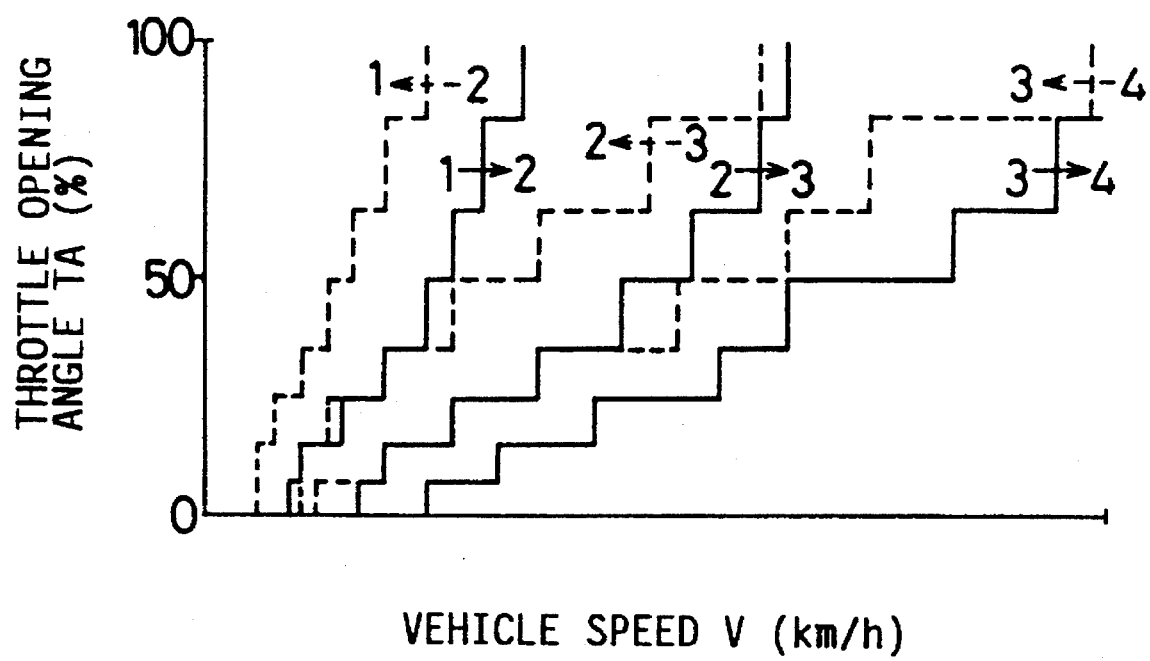
FIG. 6 is a view indicating shift boundary lines used to shift the automatic transmission.

To control the automatic transmission 14, the ROM 184 stores shift pattern data representative of shift-up and shift-down boundary lines indicated in solid and dashed lines, respectively, in FIG. 6. Each shift-up or shift-down boundary line represents a relationship between the throttle opening angle TA and a running speed V of the vehicle. The vehicle speed V is calculated from the output speed $N_{out}$ of the automatic transmission 14. The shift-up and shift-down boundary lines which correspond to the currently established position (one of the four forward drive positions) of the transmission 14 are selected and used by the electronic control device 42, to determine whether the transmission 14 should be shifted up or down or maintained in the currently established position, depending upon the detected or calculated throttle opening angle TA and vehicle speed V. Based on the determination of the position to which the transmission 14 should be shifted, the electronic control device 42 suitably controls the clutches $C_0$, $C_1$, $C_2$ and brakes $B_0$, $B_1$, $B_2$, $B_3$ to shift the transmission 14 to the newly selected one of the four forward drive positions. Thus, the electronic control device 42 incorporates shift control means 200 (FIG. 9) for controlling the shifting actions of the automatic transmission 14.

Figure 7:
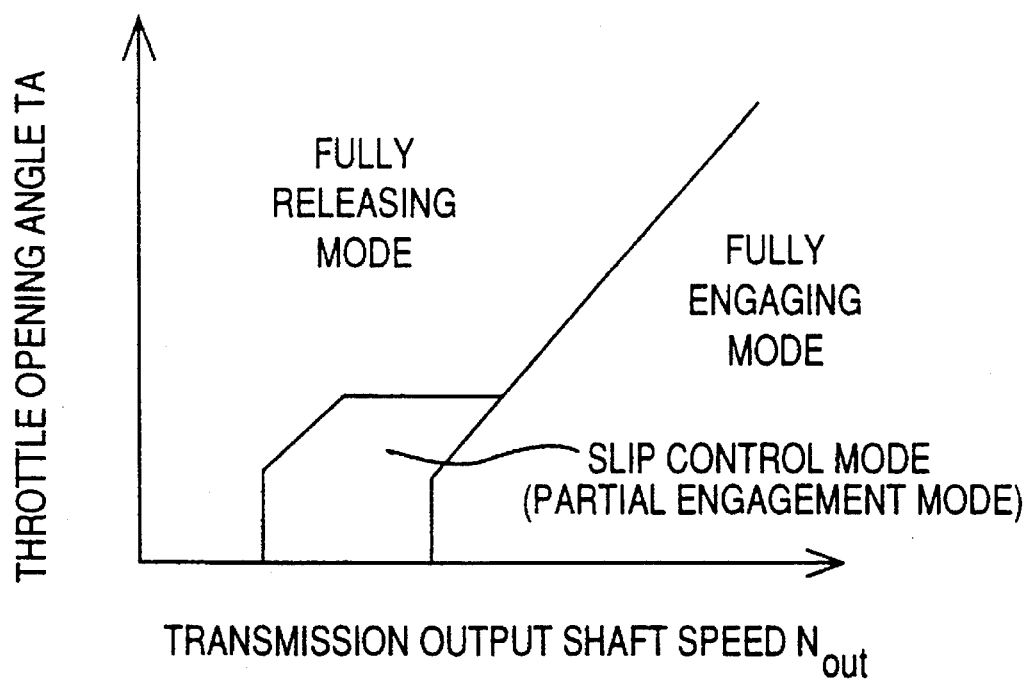
FIG. 7 is a graph indicating three control modes of the lock-up clutch in relation to the running condition of the vehicle.

The ROM 184 further stores lock-up clutch mode data representative of a plurality of relationships between selectable control modes of the lock-up clutch 32 and the running condition (throttle opening angle TA and output speed $N_{out}$ of the transmission 14) of the vehicle. Those relationships correspond to the four forward drive positions "1st", "2nd", "3rd" and "O/D" of the transmission 14, and the CPU 182 selects the relationship which corresponds to the currently established position of the transmission 14, for example, the relationship as shown in the graph of FIG. 7. For each relationship, namely, for each forward drive position of the transmission 14, there are available three different control modes of the lock-up clutch 32: a fully releasing mode in which the lock-up clutch 32 is placed in the fully released state; a fully engaging mode in which the lock-up clutch 32 is placed in the fully engaged state; and a slip control mode in which the lock-up clutch 32 is partially engaged with the amount of slip being suitably controlled so as to absorb a variation in the output torque of the engine 10.

The relationships stored in the ROM 184 are formulated so that the slip control mode for partial engagement of the lock-up clutch 32 is established to maximize the fuel economy of the engine 10 without deteriorating the drivability of the vehicle when the output speed $N_{out}$ of the transmission 14 is intermediate while the throttle opening angle TA is relatively small, as indicated in the graph of FIG. 7. The region of the slip control mode is located adjacent to the boundary between the regions of the fully releasing and fully engaging modes and to the left of the boundary. The slip control mode is also effective to effect the fuel-cut control of the engine 10 for a longer period of time while the vehicle is decelerating or coasting with the throttle opening angle TA being zero or close to zero (i.e., with the throttle valve 187 placed in the engine idling position). That is, when the lock-up clutch 32 is controlled in the slip control mode, the engine speed Ne tends to be held higher than a predetermined fuel-cut speed $N_{cut}$ for a longer period of time even with the throttle opening angle TA being zero or close to zero. In this respect, it is noted that a fuel supply from a fuel injection valve to the engine 10 is cut as long as the engine speed Ne is higher than the fuel-cut speed $N_{cut}$. In other words, the fuel is supplied to the engine 10 to prevent stalling of the engine 10 after the engine speed Ne falls below the fuel-cut speed $N_{cut}$ even while the vehicle is decelerating.

When the throttle opening angle TA and output speed $N_{out}$ detected during running of the vehicle fall within the region of the fully engaging mode in the relationship indicated in the graph of FIG. 7, the solenoid 49 of the third solenoid-operated valve 50 is energized to operate the clutch control valve 52 to the ON position, and at the same time the drive current $I_{SLU}$ applied to the linear solenoid valve 54 is set to the predetermined minimum value, whereby the lock-up clutch 32 is brought to the fully engaged position. When the detected running parameters TA and $N_{out}$ fall within the region of the fully releasing mode in the graph of FIG. 7, the solenoid 49 of the valve 50 is de-energized to operate the clutch control valve 52 to the OFF position, whereby the lock-up clutch 32 is brought to the fully released position, irrespective of the amount of the drive current $I_{SLU}$ applied to the linear solenoid valve 54. When the running parameters TA and $N_{out}$ fall within the region of the slip control mode in the graph of FIG. 7, the solenoid 49 of the third solenoid-operated valve 50 is energized to operate the clutch control valve 52 to the ON position, and at the same time the drive current $I_{SLU}$ applied to the linear solenoid valve 54 is controlled according to the following formula (7), for example:

$$I_{SLU} = I_{FWD} + I_{F/B} \qquad (7)$$

Figure 8:
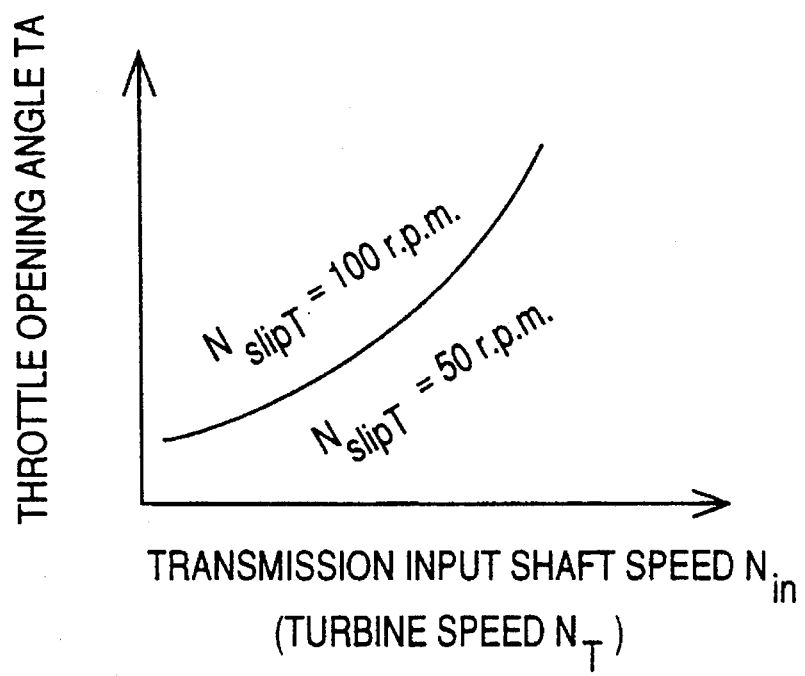
FIG. 8 is a graph indicating a relationship between between a throttle valve opening angle TA and an input shaft speed $N_{in}$ of the transmission, which relationship is used to determine a target slip speed $N_{slipT}$ of the lock-up clutch during steady or stable running of the vehicle.

Described in detail, a feed-forward control value $I_{FWD}$ and a feed-back control value $I_{F/B}$ are determined so as to zero an error $\Delta N$ of an actual slip speed $N_{slip}$ of the lock-up clutch 32 from a desired or target slip speed $N_{slipT}$, according to a predetermined relationship as indicated in the graph of FIG. 8, for instance. The drive current $I_{SLU}$ is determined to be a sum of the feed-forward and feed-back values $N_{slip}$ and $N_{slipT}$.

Figure 9:
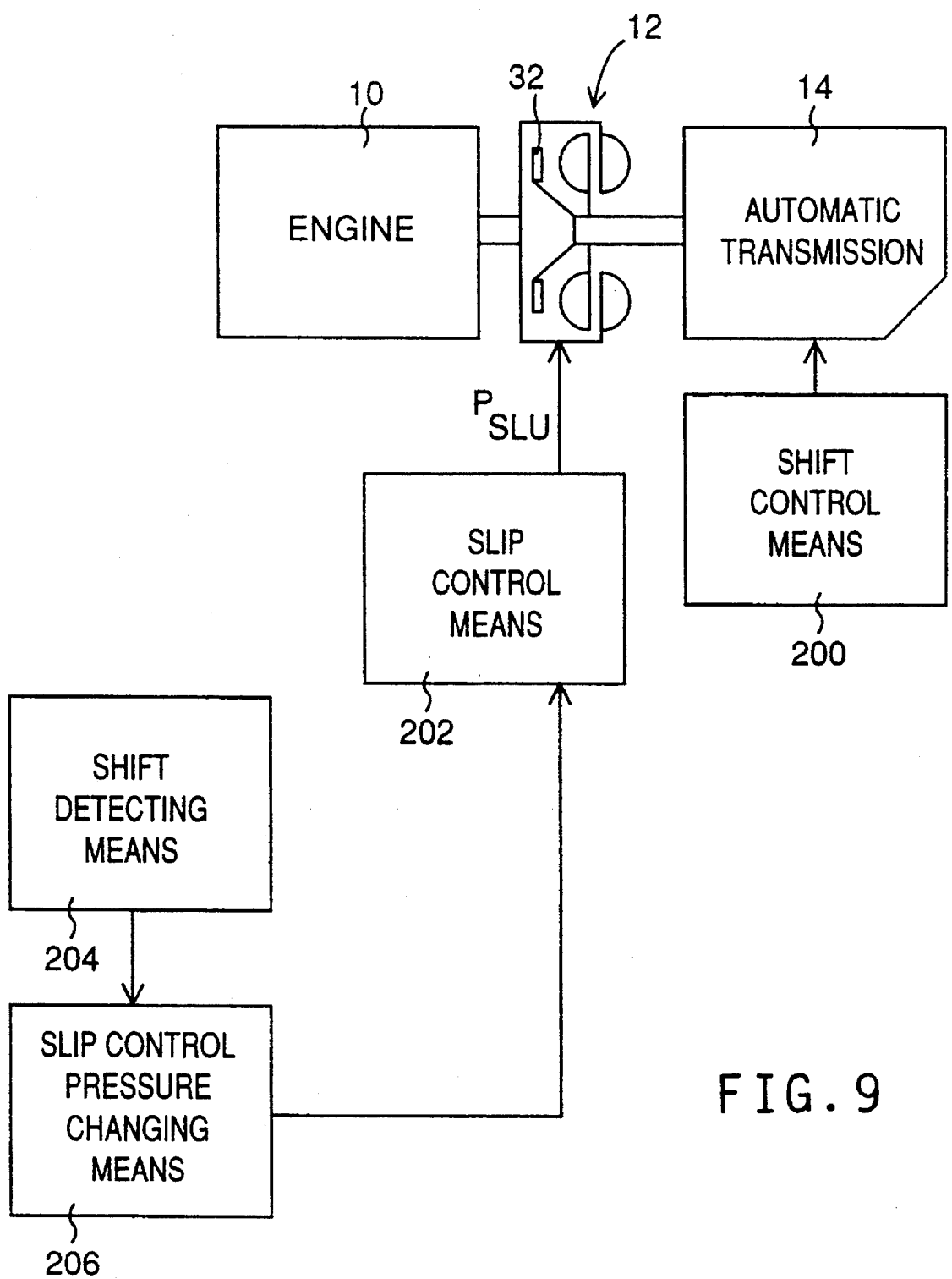
FIG. 9 is a block diagram illustrating functional elements of an electronic control device of the control system of FIG. 1.

Referring next to the block diagram of FIG. 9, there will be described the functional elements or means of the electronic control device 42, which relate to the principle of the present invention. The shift control means 200 indicated above determines the forward drive position to which the transmission 14 should be shifted, according to the stored shift-up and shift-down boundary lines corresponding to the currently established position of the transmission 14, and depending upon the currently detected or calculated running parameters TA and V of the vehicle. The shift control means 200 commands the transmission 14 to be shifted to the determined new position. The electronic control device 42 further incorporates slip control means 202 for determining the drive current $I_{SLU}$ to control the slip control pressure $P_{SLU}$ for establishing the target slip speed $N_{slipT}$, while the vehicle is running with the parameters TA and $N_{out}$ falling within the region of the slip control mode as defined by the lock-up clutch mode data stored in the ROM 184, for example, while the vehicle is coasting or decelerating with the accelerator pedal being released and placed in the non-operated position. The electronic control device 42 also incorporates shift detecting means 204 for detecting that the automatic transmission 14 is in the process of a shifting action during deceleration of the vehicle. The control device 42 further incorporates slip control pressure changing means 206, which is responsive to the detection of a shifting action of the transmission 14 by the shift detecting means 204. The slip control pressure changing means 206 commands the slip control means 202 to change the drive current $I_{SLU}$ and thereby change the slip control pressure $P_{SLU}$ to a first level lower than a second level which is normally established by the slip control means 202, that is, established when the transmission 14 is not in the process of a shifting action. As a result, the engaging force of the lock-up clutch 32 is held at the accordingly reduced value for a period preceding the completion of the shifting action of the transmission 14. This arrangement is effective to reduce or minimize the shifting shock of the transmission 14 at the terminal portion of the shifting action while the vehicle is coasting or decelerating.

Figure 10A:
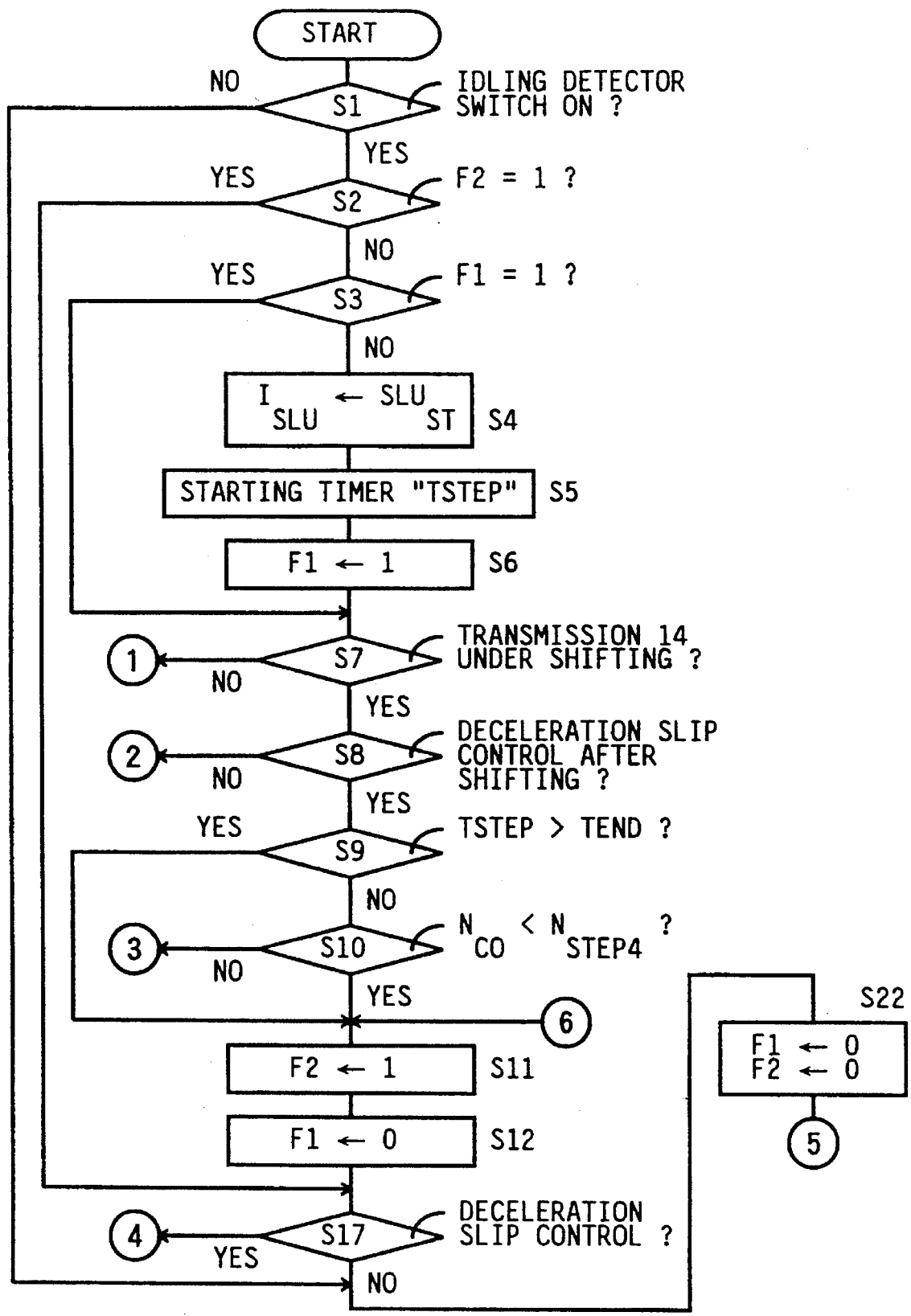
FIGS. 10A and 10B are flow charts illustrating an operation performed by the electronic control device of FIG. 9 to control the amount of slip of the lock-up clutch slip during deceleration of the vehicle.
Figure 10B:
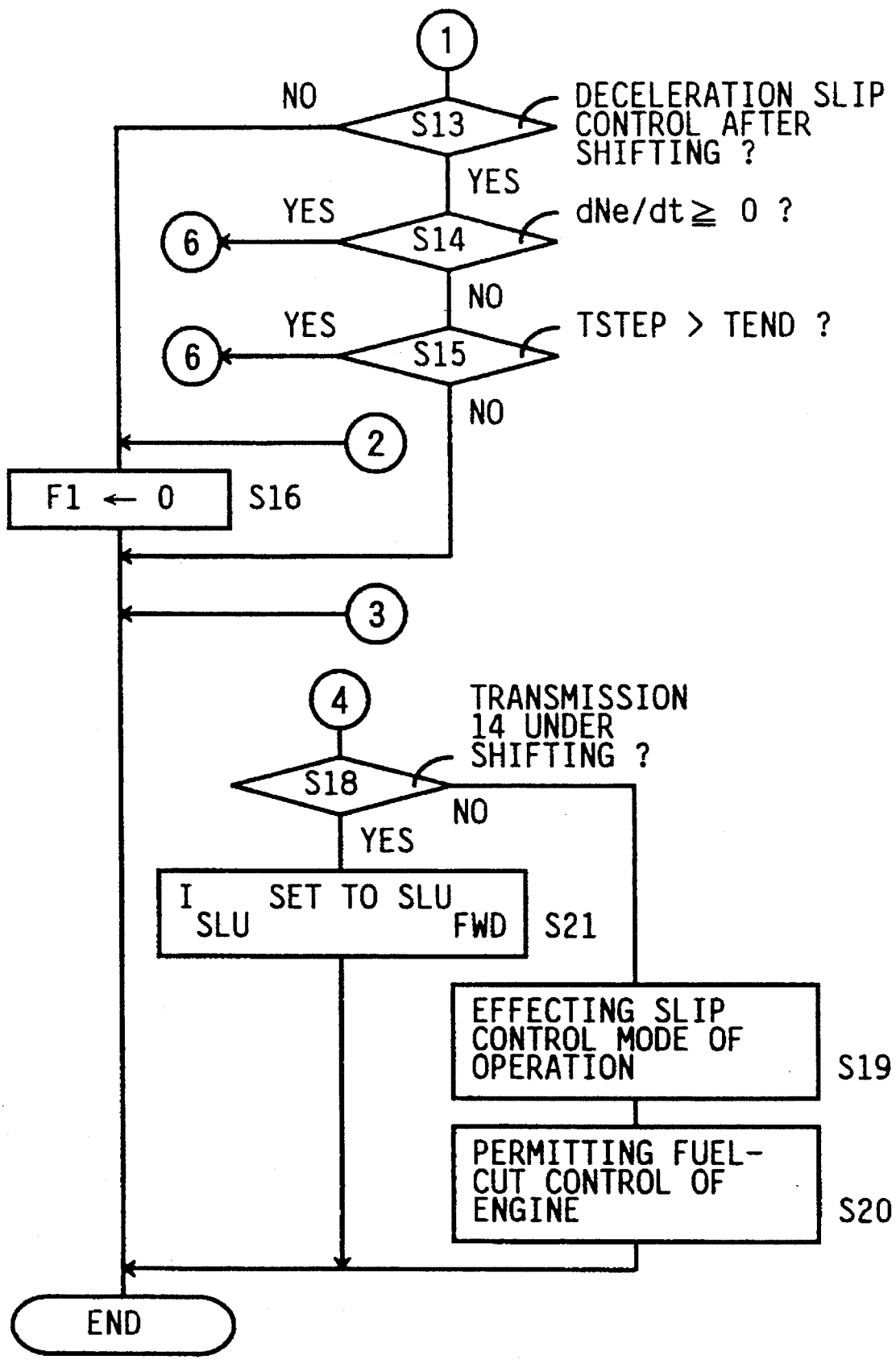

Reference is now made to the flow charts of FIGS. 10A and 10B, which show an operation of the electronic control device 42 to control the amount of slip of the lock-up clutch 32 during deceleration of the vehicle. This operation of the control device 42 will be referred to as "deceleration slip control" of the lock-up clutch 32 where appropriate. Referring to the time chart of FIG. 11 as well as the flow charts of FIGS. 10A and 10B, there will be described a routine executed by the electronic control device 42 to effect the deceleration slip control when the transmission 14 is shifted up from the third-speed position "3rd" to the overdrive position "O/D" in response to the detection of a return movement of the accelerator pedal to its non-operated position, which causes deceleration of the vehicle.

The deceleration slip control routine of FIGS. 10A and 10B is initiated with step S1 to determine whether the idling detector switch provided on the throttle sensor 188 is placed in the ON position or not. If a negative decision (NO) is obtained in step S1, the control flow goes to step S22 to reset flags F1 and F2 to "0", and one cycle of this routine is completed. When an affirmative decision (YES) is obtained in step S1, this means that the throttle opening angle TA is substantially zeroed, as indicated at point "a" in FIG. 11. Namely, a return of the accelerator pedal to the non-operated position will cause deceleration of the vehicle. In this case, step S1 is followed by step S2 to determine whether the flag F2 is set at "1". Initially, this flag F2 is set at "0" and a negative decision (NO) is obtained in step S2, and step S3 is then implemented to determine whether the flag F1 is set at "1".

Since the flag F1 is also initially set at "0", a negative decision (NO) is obtained in step S3, and the control flow goes to step S4 to set the drive current $I_{SLU}$ to a predetermined initial value $SLU_{ST}$, which is smaller than but close to the 100% or maximum value, as indicated in FIG. 11. The drive current $I_{SLU}$ is initially raised to the relatively large initial value SLUST, to permit the lock-up clutch 32 to be initially engaged in an initial period of deceleration of the vehicle. Step S4 is followed by step S5 to start a timer TSTEP for measuring a time period for which the current $I_{SLU}$ is held at the predetermined initial value $SLU_{ST}$. Then, the control flow goes to step S6 to set the flag F1 to "1". In the next cycle of execution of the present routine, therefore, an affirmative decision (YES) is obtained in step S3, and step S3 is directly followed by step S7.

Step S7 is implemented to determine whether the automatic transmission 14 is in the process of a shifting action. In this respect, it is noted that the transmission 14 is generally shifted up according to the appropriate shift-up boundary line as illustrated in FIG. 6, some time after the vehicle deceleration is started with the idling detector switch being ON (with the accelerator pedal returned to the non-operated position). The detection of a shifting action of the transmission 14 in step S7 is effected on the basis of a speed $N_{co}$ of the clutch Ca and the output speed $N_{out}$ of the transmission 14, more precisely, on the basis of a difference between these speeds $N_{co}$ and $N_{out}$. When the vehicle is running with the transmission 14 placed in the third-speed position "3rd", for example, the speed $C_{co}$ of the clutch $C_0$ and the output speed $N_{out}$ of the transmission 14 are equal to each other, and there arises a difference between these speeds $N_{co}$ and $N_{out}$ when the shift-up action to the overdrive position "O/D" is initiated. The speed $N_{co}$ is zeroed when this shift-up action is completed. Thus, the shift-up action of the transmission 14 can be detected.

If the transmission 14 is not in the process of a shifting action, a negative decision (NO) is obtained in step S7, and the control flow goes to step S13 to determine whether the vehicle running parameters TA and $N_{out}$ fall within the region of the slip control mode of the lock-up clutch 32 after a shifting action of the transmission 14. If a negative decision (NO) is obtained in step S13, the control flow goes to step S16 to reset the flag F1 to "0", and one cycle of the routine is completed. If an affirmative decision (YES) is obtained in step S13, step S14 is implemented to determine whether a rate of change dNe/dt of the engine speed Ne is zero or positive, that is, whether the vehicle has started deceleration or not. If a negative decision (NO) is obtained in step S14, step S15 is implemented to determine whether the content of the timer TSTEP exceeds a predetermined threshold value TEND. If a negative decision (NO) is obtained in step S15, one cycle of the routine is completed.

If an affirmative decision (YES) is obtained in step S14 or step S15, the control flow goes to step S11 to set the flag F2 to "1", and step S12 to reset the flag F2 to "0". Then, step S17 is implemented to determine whether the running parameters TA and $N_{out}$ of the vehicle fall within the slip control mode region of the lock-up clutch 32. If a negative decision (NO) is obtained in step S17, step S22 is implemented to reset the flags F1 and F2 to "0", and one cycle of execution of the present routine is completed. If an affirmative decision (YES) is obtained in step S17, step S18 is implemented to determine whether the transmission 14 is still in the process of a shifting action. In this specific example, the transmission 14 is not in the process of a shifting action at this point of time. Therefore, a negative decision (NO) is obtained in step S18, and the control flow goes to step S19 to effect the deceleration slip control, that is, control the amount of slip of the lock-up clutch 32 according to the above formula (7). Step S19 is followed by step S20 to permit the fuel-cut control of the engine 10. Thus, while the transmission 14 is not in the process of a shifting action, the slip control pressure $P_{SLU}$ is increased to a level corresponding to the predetermined relatively high initial value $SLU_{ST}$ of the drive current $I_{SLU}$, and then the lock-up clutch 32 is controlled in the slip control mode during deceleration of the vehicle, with the engine 10 controlled in the fuel-cut mode.

When the transmission 14 is in the process of a shifting action (e.g., from the third-speed position "3rd" to the overdrive position "O/D"), an affirmative decision (YES) is obtained in step S7, and the control flow goes to step S8 similar to step S13 described above, to determine whether the parameters TA and $N_{out}$ fall within the region of the slip control mode of the lock-up clutch 32. This determination is effected based on the relationship as indicated in FIG. 7 as discussed above. In the condition where the affirmative decision (YES) is obtained in step S1, the throttle opening angle TA is zero, and the determination in step S8 is effected solely on the basis of the output speed $N_{out}$. If a negative decision (NO) is obtained in step S8 step S16 is implemented to reset the flag F1 to "0" and the present routine is executed again. If an affirmative decision (YES) is obtained in step S8, the control flow goes to step S9 similar to step S15, to determine whether the content of the timer TSTEP exceeds the threshold value TEND, which corresponds to a suitable length of time during which the drive current $I_{SLU}$ is held at the initial level $SLU_{ST}$. This length of time is indicated as "a–b" in FIG. 11.

In an early period following the affirmative decision (YES) in step S1, a negative decision (NO) is obtained in step S9, and the control flow goes to step S10 to determine whether the speed $N_{co}$ of the clutch $C_0$ is lower than a predetermined threshold value $N_{step4}$, in this example where the transmission 14 is shifted up from the third-speed position "3rd" to the overdrive position "O/D". Where the transmission 14 is shifted up from the second-speed position "2nd" to the third-speed position "3rd", step S10 is formulated to determine whether a difference ($N_{co}$ - $N_{out}$) is smaller than a predetermined threshold value $N_{step3}$. These threshold values $N_{step4}$ and $N_{step3}$ determine the period during which the drive current $I_{SLU}$ is held at the initial level $SLU_{ST}$ and at a lowered level $SLU_{FWD}$ discussed below. The threshold values $N_{step4}$ and $N_{step3}$ are determined so as to permit both initiation of partial engagement of the lock-up clutch 32 and the shifting action of the transmission 14 with a reduced shifting shock. Initially, a negative decision (NO) is obtained in step S10, and the present routine is executed again.

With the present routine repeatedly executed, an affirmative decision (YES) is obtained in step S10, and steps S11 and S12 are implemented to set the flag F2 to "1" and reset the flag F1 to "0". Then, step S17 is implemented to determine whether the parameters TA and $N_{out}$ fall within the region of the slip control mode of the lock-up clutch 32. If a negative decision (NO) is obtained in step S17, step S22 is implemented to reset the flags F1 and F2 to "0", and one cycle of the routine is completed.

If an affirmative decision (YES) is obtained in step S17, the control flow goes to step S18 to determine whether the transmission 14 is in the process of a shifting action. If so, an affirmative decision (YES) is obtained in step S18, and step S21 is implemented to reduce the drive current $I_{SLU}$ to a predetermined small value $SLU_{FWD}$, as indicated at "b" in the time chart of FIG. 11. As indicated above, the value $SLU_{FWD}$ corresponds to a level of the slip control pressure $P_{SLU}$ which is lower than the level normally established in the slip control mode. That is, the value $SLU_{FWD}$ corresponds to an engaging force of the lock-up clutch 32, which is smaller than the engaging force obtained in the normal slip control mode without step S21. Thus, the drive current $I_{SLU}$ is lowered to the predetermined value $SLU_{FWD}$ to reduce the engaging force of the lock-up clutch 32, for minimizing the shifting shock of the transmission 14 to the extent that permits the lock-up clutch 32 to be kept in the partially engaged state.

When the shifting action of the transmission 14 is completed, a negative decision (NO) is obtained in step S18, and the control flow goes to step S19 to initiate the deceleration slip control of the lock-up clutch 32 according to the above formula (7), as indicated at point "c" in FIG. 11. The amount of slip of the lock-up clutch 32 is controlled so as to coincide with the target value $N_{slipT}$, after the termination of the shifting action of the transmission 14 which is preceded by the reduction of the slip control pressure $P_{SLU}$ to the level $SLU_{FWD}$ to increase the amount of slip $N_{slip}$ of the lock-up clutch 32 for the purpose of minimizing the shifting shock of the transmission 14. Step S19 is repeatedly implemented to control the lock-up clutch 32 in the slip control mode so that the actual amount of slip $N_{slip}$ is controlled to the target slip speed $N_{slipT}$ (50 r.p.m.), which is determined according to the predetermined relationship of FIG. 8 as described above. Step S19 is followed by step S20 to permit the fuel-cut control of the engine 10, so that the fuel-cut control of the engine 10 is initiated a predetermined time after the initiation of the slip control of the lock-up clutch 32. The initiation of the fuel-cut control is indicated at "d" in the time chart of FIG. 11.

It will be understood from the above description of the present embodiment of the invention that step S18 corresponds to the shift detecting means 204, and step S21 corresponds to the slip control pressure changing means 206. In the present embodiment, the slip control pressure $P_{SLU}$ is lowered in step S21 after the shifting action of the transmission 14 is detected in step S18, and is held at the lowered level for a given period preceding the completion of the shifting action, so that the engaging force of the lock-up clutch 32 is reduced for that period, with respect to the engaging force controlled in the following deceleration slip control of the lock-up clutch 32 by the slip control means 202. Since the engaging force of the lock-up clutch 32 is reduced for the predetermined terminal portion of the shifting action of the transmission 14, the shifting action can be completed with a reduced shock due to engagement of the lock-up clutch 32 during deceleration of the vehicle.

The present embodiment is also adapted such that the slip control pressure $P_{SLU}$ is held at the relatively high initial level to increase the engaging force of the lock-up clutch 32 for a suitable period of time before the deceleration slip control of the lock-up clutch 32 is initiated, so as to permit the lock-up clutch 32 to initiate an engaging action before the deceleration slip control is initiated.

Figure 12:
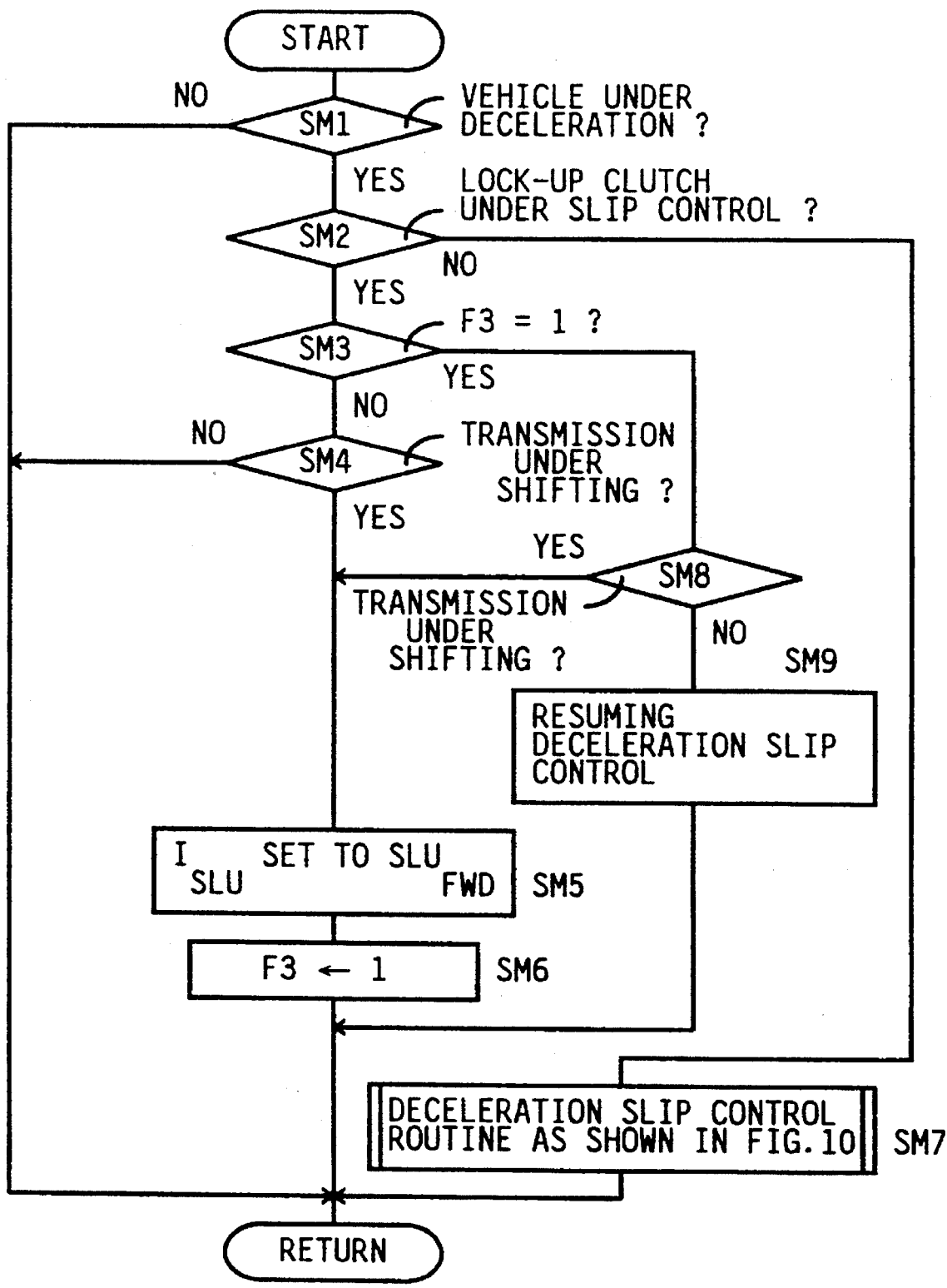
FIG. 12 is a flow chart illustrating an operation of an electronic control device constructed according to another embodiment of the present invention.

Referring next to the flow chart of FIG. 12, there will be described a second embodiment of this invention. The routine illustrated in FIG. 12, which is also executed by the electronic control device 42, is initiated with step SM1 to determine whether the vehicle is decelerating. This determination is also effected by checking if the accelerator pedal has been returned to the non-operated position. If a negative decision (NO) is obtained in step SM1, one cycle of execution of the routine is terminated. If an affirmative decision (YES) is obtained in step SM1, step SM2 is implemented to determine whether the deceleration slip control of the lock-up clutch 32 is being effected with the running parameters of the vehicle falling within the region of the slip control mode as indicated in FIG. 7. If a negative decision (NO) is obtained in step SM2, the control flow goes to step SM5 to execute a deceleration slip control routine as illustrated in FIGS. 10A and 10B. If an affirmative decision (NO) is obtained in step SM2, step SM3 is implemented to determine whether a flag F3 is set at "1". Initially, a negative decision (NO) is obtained in step SM3, and the control flow goes to step SM4 to determine whether the transmission 14 is in the process of a shifting action. If a negative decision (NO) is obtained in step SM4, one cycle of the routine is terminated. If an affirmative decision (YES) is obtained in step SM4, step SM5 similar to step S21 is implemented to set the drive current $I_{SLU}$ to a predetermined relatively low level $SLU_{FWD}$, as indicated at point "a" in the time chart of FIG. 13. Thus, the slip control pressure $P_{SLU}$ is lowered to reduce the engaging force of the lock-up clutch 32 below the level established during the deceleration normal slip control. Step SM5 is followed by step SM6 to set the flag F2 to "1", and one cycle of the routine is terminated.

Figure 13:
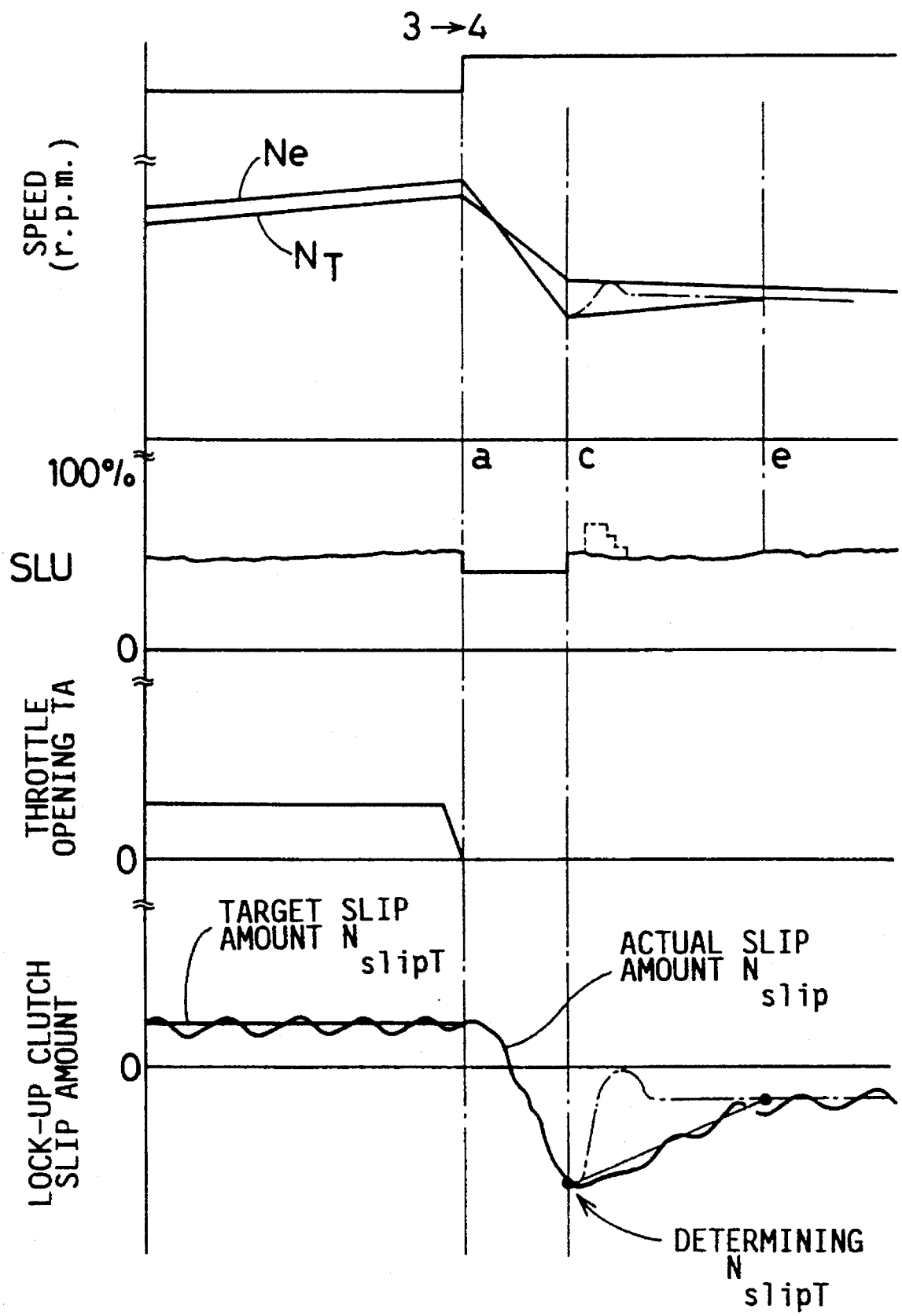
FIG. 13 is a time chart explaining the operation of the electronic control device of FIG. 12, wherein one-dot chain lines indicate the operation of the known device.

In the following cycles of the routine, an affirmative decision (YES) is obtained in step SM3, and the control flow goes to step SM8 to determine whether the transmission 14 is in the process of a shifting action. Since an affirmative decision (YES) is obtained in step SM8 as long as the transmission 14 is in the process of a shifting action, steps SM5 and SM6 are repeatedly implemented. If the shifting action is completed, a negative decision (NO) is obtained in step SM8, and step SM9 is implemented to resume the deceleration slip control, as indicated at point "c" in FIG. 13. Thus, the slip control pressure $P_{SLU}$ is lowered to increase the slip amount $N_{slip}$ of the lock-up clutch 32 during the terminal portion of the shifting action of the transmission 14. After the termination of the shifting action, the target slip amount $N_{slipT}$ (50 r.p.m.) of the lock-up clutch 32 is determined according to the predetermined relationship as indicated in the graph of FIG. 8, and the actual slip amount $N_{slip}$ is controlled to the determined target value $N_{slipT}$. In the example of FIG. 13, the actual slip amount $N_{slip}$ coincides with the target value $N_{slipT}$ at point "e". This arrangement also assures smooth transition to the deceleration slip control without a shifting shock of the transmission 14.

In the time chart of FIG. 13, solid lines indicate the parameters changing in the present second embodiment of the invention, while one-dot chain lines indicate the same parameters changing in the known arrangement, when the transmission 14 is shifted up from the third-speed position "3rd" to the overdrive position "O/D". In the present embodiment wherein step SM4 corresponds to the shift detecting means 204, while step SM5 corresponds to the slip control pressure changing means 206, the slip control pressure $P_{SLU}$ is lowered in step SM5 to the level lower than the level established during the deceleration slip control, when the shift-up action of the transmission 14 from the third-speed position to the overdrive position is detected in step SM4 during deceleration of the vehicle. Therefore, even if the deceleration slip control has been initiated (step SM2) before the initiation of a shifting action of the transmission 14, the shifting shock upon completion of the shifting action can be reduced or minimized. The present second embodiment is also effective when the transmission 14 is once placed in the third-speed position with an overdrive disable switch (OVERDRIVE OFF switch) set at ON during deceleration of the vehicle and is then shifted up to the overdrive position with the overdrive disable switch reset to OFF. When the overdrive disable switch is ON, it functions to inhibit the transmission 14 from being placed in the overdrive position.

The values $SLU_{ST}$ and $SLU_{FWD}$ to which the drive current $I_{SLU}$ is changed upon detection of the vehicle deceleration and a shifting action of the transmission 14 may be suitably adjusted or updated on the basis of a change in the output speed $N_{out}$ after the shifting action of the transmission 14. Further, the periods during which the drive current $I_{SLU}$ is held at those values $SLU_{ST}$ and $SLU_{FWD}$ may be adjusted as well as or in place of the values. The electronic control device 42 may be adapted to execute a routine for adjusting or updating those values $SLU_{ST}$ and $SLU_{FWD}$ and/or the periods of the values, as well as the routine of FIGS. 10A, 10B, for example.

Figure 14A:
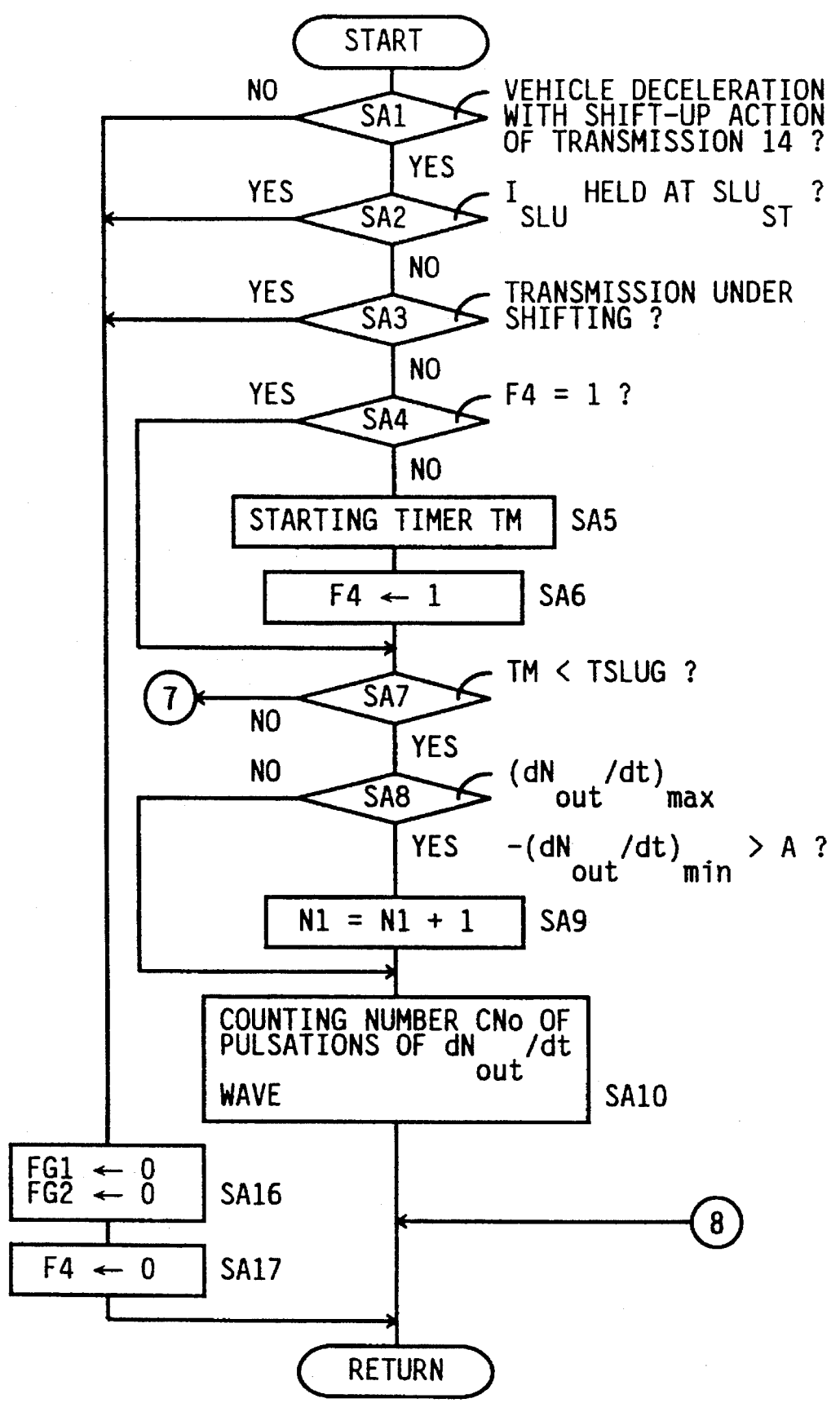
FIGS. 14A and 14B are flow charts illustrating an operation of an electronic control device constructed according to a further embodiment of the invention.
Figure 14B:
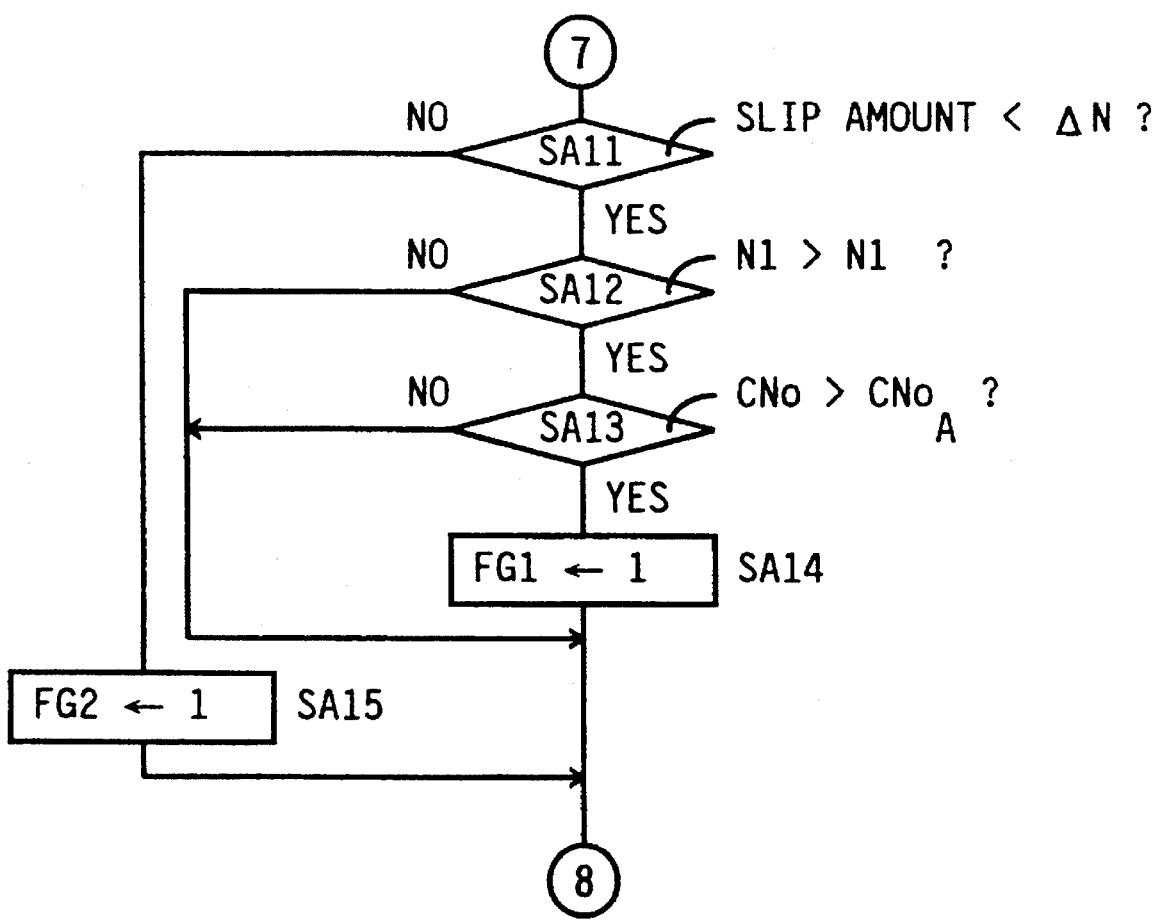

To execute such adjusting or updating routine, the variation in the output speed $N_{out}$ of the transmission 14 is monitored by a routine as shown in the flow charts of FIGS. 14A and 14B, by way of example. This monitoring routine is initiated with step SA1 to determine whether the deceleration slip control is effected during vehicle deceleration which has caused a shift-up action of the transmission 14 after the return movement of the accelerator pedal to the non-operated position. If a negative decision (NO) is obtained in step SA1, step SA16 is implemented to reset flags FG1 and FG2 to "0", and step SA17 to reset a flag F4 to "0", and one cycle of the routine is terminated.

If an affirmative decision (YES) is obtained in step SA1, that is, if the deceleration slip control involving a shift-up action of the transmission 14 is effected, the control flow goes to step SA2 to determine whether the drive current $I_{SLU}$ is set at the initial level $SLU_{ST}$. If a negative decision (NO) is obtained in step SA2, step SA3 similar to step S7 is implemented to determine whether the transmission 14 is in the process of the shift-up action, that is, to determine whether the deceleration slip control is effected according to the above formula (7) after the completion of the shift-up action of the transmission 14. If an affirmative decision (YES) is obtained in step SA2 or SA3, steps SA16 and SA17 are implemented. If a negative decision (NO) is obtained in both steps SA2 and SA3, the control flow goes to step SA4 to determine whether the flag F4 is set at "1". This flag F4 is set to "1" at point "c" in the time chart of FIG. 15, as described below.

Figure 15:
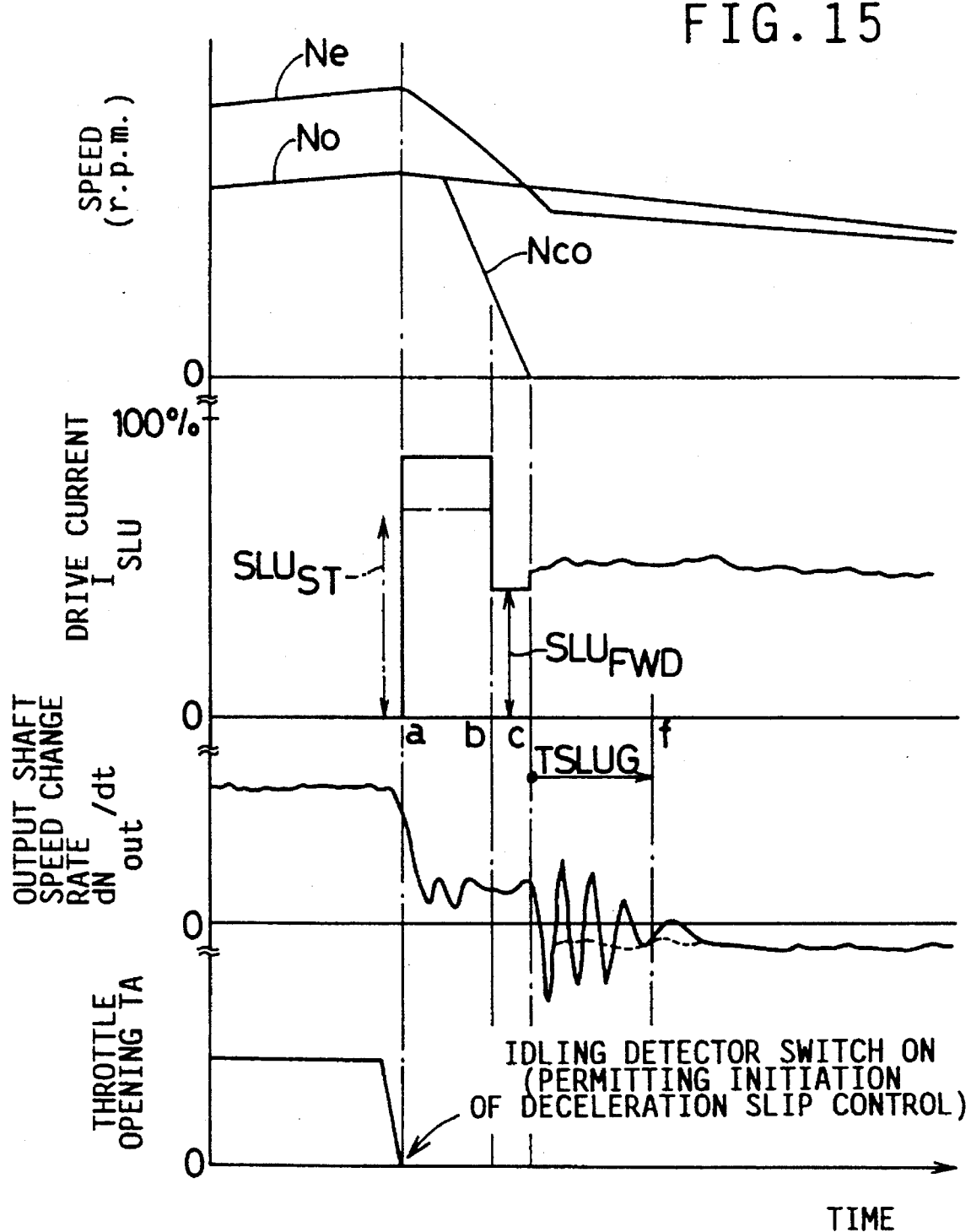
FIG. 15 is a time chart explaining the operation of the electronic control device of FIG. 14.

Initially, a negative decision (NO) is obtained in step SA4, and step SA5 is implemented to start a timer TM to measure a time duration TSLUG, as indicated at "c" in FIG. 15. Step SA5 is followed by step SA6 to set the flag F4 to "1". In the next cycles of execution of the routine, an affirmative decision (YES) is obtained in step SA4, and step SA4 is followed directly by step SA7 to determine whether the content of the timer TM is smaller than the value TSLUG, that is, whether the time TSLUG has not passed after the timer TM has been started. The time duration TSLUG is a time period during which the output speed $N_{out}$ of the transmission 14 is monitored.

If an affirmative decision (YES) is obtained in step SA7, the control flow goes to step SA8 to calculate a rate of change $dN_{out}/dt$ of the output speed $N_{out}$ of the transmission 14, and determine whether an amount of change [$(dN_{out}/dt)$max - $(dN_{out}/dt)$min] of the rate of change $dN_{out}/dt$ exceeds a predetermined value "A". Since the amount of change [$(dN_{out}/dt)$max - $(dN_{out}/dt)$min] approximates to an amount of change of the torque to be transmitted through the transmission 14, this value may be used as a parameter which reflects a shifting shock of the transmission, that is, a variation in the transmission torque after the completion of the shifting action.

If an affirmative decision (YES) is obtained in step SA8, step SA9 is implemented to increment a counter N1. Then, the control flow goes to step SA10 to cause a counter CNo to count the number of peaks or maximal and minimal points of a wave which represents the rate of change $dN_{out}/dt$ of the output speed $N_{out}$, and one cycle of the routine is terminated. The counter N1 counts the number of pulsations of the $dN_{out}/dt$ wave whose amplitude is larger than the predetermined value "A". Therefore, if a negative decision (NO) is obtained in step SA8, step SA9 is not implemented, and step SA8 is followed directly by step SA10. The counter CNo counts the number of all the pulsations of the $dN_{out}/dt$ wave.

When the content of the timer TM reaches the predetermined value TSLUG, the control flow goes to step SA11. This point of time is indicated at "f" in the time chart of FIG. 15. Step SA11 is implemented to determine whether the amount of slip $N_{slip}$ of the lock-up clutch 32 is smaller than a predetermined threshold $\Delta N$. This threshold $\Delta N$ is used to monitor the engaging state of the lock-up clutch 32, more specifically, to determine whether the lock-up clutch 32 is substantially fully engaged after the transmission 14 has been shifted up.

If a negative decision (NO) is obtained in step SA11, this means that the lock-up clutch 32 has not been substantially fully engaged. In this case, step SA15 is implemented to set the flag FG2 to "1" for incrementing the engaging force of the lock-up clutch 32. If an affirmative decision (YES) is obtained in step SA11, the control flow goes to step SA12 to determine whether the content of the counter N1 exceeds a predetermined threshold $N1_A$. If an affirmative decision (YES) is obtained in step SA12, step SA13 is implemented to determine whether the content of the counter CNo exceeds a predetermined threshold $CNo_A$. These threshold values $N1_A$ and $NCo_A$ are used to monitor a variation in the transmission torque after the shifting action of the transmission 14. The values $N1_A$ and $NCo_A$ may be fixed constants or variables which vary as a function of the vehicle speed V.

If an affirmative decision (YES) is obtained in both steps SA12 and SA13, the control flow goes to step SA14 to set the flag FG1 to "1" for decrementing the engaging force of the lock-up clutch 32, and one cycle of the routine is terminated.

The flags FG1 and FG2 whose states are controlled by the monitoring routine of FIGS. 14A and 14B are used in the above-indicated adjusting or updating routine. For example, this adjusting routine is formulated to make at least one of the following adjustments of parameters associated with the slip control pressure $P_{SLU}$, when the flag FG1 is set to "1" in the monitoring routine of FIGS. 14A and 14B:

a) decrementing the initial level $SLU_{ST}$ of the drive current $I_{SLU}$;

b) retarding the point of time "a" (FIG. 15) at which the drive current $I_{SLU}$ is set to the initial value $SLU_{ST}$;

c) changing the value $N_{step4}$ (or $N_{step3}$) used in step S10 of the flow chart of FIG. 10A, to decrement the time duration between the points "a" and "b" (FIG. 15) for which the drive current $I_{SLU}$ is held at the initial value $SLU_{ST}$;

d) decrementing the value $SLU_{FWD}$ which follows the initial value $SLU_{ST}$; and e) incrementing the time duration between the points "b" and "c" (FIG. 15) for which the drive current $I_{SLU}$ is held at the value $SLU_{FWD}$.

The adjusting routine is also formulated to make at least one of the following adjustments when the flag FG2 is set to "1" in the monitoring routine of FIGS. 14A and 14B:

i) incrementing the initial level $SLU_{ST}$ of the drive current $I_{SLU}$;

ii) advancing the point of time "a" (FIG. 15);

iii) changing the value $N_{step4}$ (or $N_{step3}$) to increment the time duration between the points "a" and "b" (FIG. 15);

iv) incrementing the value $SLU_{FWD}$; and v) decrementing the time duration between the points "b" and "c" (FIG. 15).

It will be understood that if the affirmative decision (YES) is obtained in step SA11, steps SA12 and SA13 are implemented to determine whether the pulsations of the wave representative of the amount of change $dN_{out}/dt$ of the output speed $N_{out}$ of the transmission 14 have a relatively large amplitude and a relatively high frequency. If the affirmative decision (YES) is obtained in both of these steps SA12 and SA13, the flag FG1 is set to "1" in step SA14 to decrement the engaging force of the lock-up clutch 32. The engaging force of the lock-up clutch 32 is decremented until the amplitude of the pulsations of the $dN_{out}/dt$ wave is sufficiently reduced or the frequency of the pulsations is sufficiently lowered. According to this arrangement, at least one of the parameters associated with the slip control pressure $P_{SLU}$ or drive current $I_{SLU}$ to determine the engaging force of the lock-up clutch 32 is adjusted or updated to meet the actual variation in the torque transmitted through the transmission 14 after the shift-up action, so as to minimize or eliminate the shifting shock of the transmission.

In the present third embodiment of the invention, steps SA11 through SA14 correspond to monitoring means for monitoring the variation in the output speed $N_{out}$ or torque of the automatic transmission 14, to adjust or update one or more parameters associated with the slip control pressure $P_{SLU}$ or drive current $I_{SLU}$, as described above, so that the engaging force of the lock-up clutch 32 is suitably adjusted to reduce or minimize the torque or speed variation of the transmission 14 after the completion of the shift-up action of the transmission 14 due to deceleration of the vehicle as indicated by dashed line in FIG. 15, contrary to a relatively large variation in the conventional arrangement indicated by solid line. The present arrangement assures consistent adjustment of the engaging force of the lock-up clutch 32 irrespective of various fluctuating factors such as a deviation of the characteristics of the lock-up clutch 32 from the nominal specifications, a chronological change of the characteristics, and a change in the viscosity of the working fluid for the lock-up clutch 32.

Figure 16:
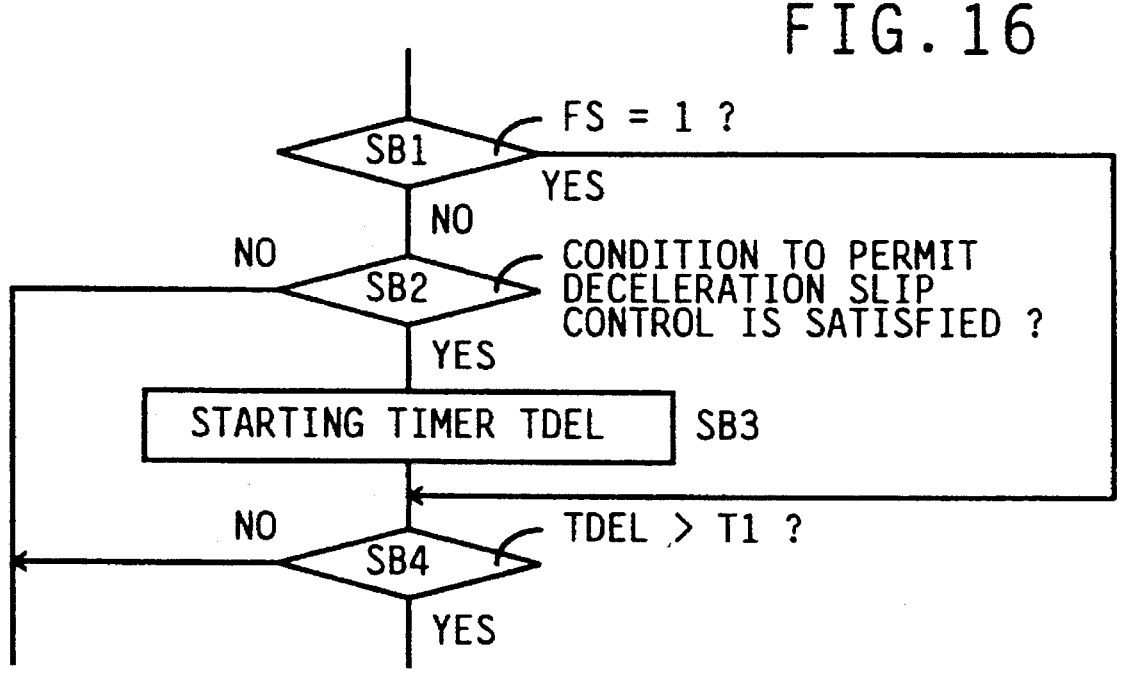
FIG. 16 is a flow chart showing a still further embodiment of the invention wherein steps SB1–SB4 are substituted for step SA1 of the flow chart of FIG. 14.

Referring next to the flow chart of FIG. 16, there will be described a modification of the embodiment of FIGS. 14A and 14B. In this modified embodiment, steps SB1 through SB4 are substituted for step SA1 of FIG. 14A. Described in detail, step SB1 is provided to determine whether a flag FS1 is set at "1" This flag FS1, when set at "1" indicates that the transmission 14 is in the process of a shifting action. If a negative decision (NO) is obtained in step SB1, the control flow goes to step SB2 to determine whether a condition to permit the deceleration slip control of the lock-up clutch 32 has been satisfied. If a negative decision (NO) is obtained, one cycle of the routine is terminated. If an affirmative decision (YES) is obtained in step SB2, step SB3 is implemented to start a timer TDEL. Step SB3 is followed by step SB4 to determine whether the content of the timer TDEL exceeds a predetermined threshold T1. If a negative decision (NO) is obtained in step SB4, one cycle of the routine is terminated. If an affirmative decision (YES) is obtained in step SB4, the control flow goes to step SA2 of FIG. 14A. The adjustment of the point "a" when the flag FG1 or FG2 is set to "1" in step SA14 or SA15 of the monitoring routine can be accomplished by changing the threshold T1. The present modified embodiment is effective not only to minimize the shifting shock of the transmission 14 in an initial period of the deceleration slip control of the lock-up clutch 32, but also to control the point of time at which the drive current $I_{SLU}$ is raised to the relatively high initial level $SLU_{ST}$.

While the present invention has been described in detail in its presently preferred embodiments with a certain degree of particularity, it is to be understood that the invention is not limited to the details of the illustrated embodiments, but may be otherwise embodied.

Although the foregoing description of the preferred embodiments refers to a shift-up action of the transmission 14 during deceleration of the vehicle, the principle of the invention is equally applicable where the transmission 14 is shifted down during deceleration of the vehicle. In this case, too, the slip control pressure $P_{SLU}$ determining the engaging force of the lock-up clutch 32 is lowered in a terminal portion of the shift-down action of the transmission 14 to minimize the shift-down shock.

In the illustrated embodiments, the linear solenoid valve 54 is adapted such that the slip control pressure $P_{SLU}$ generated increases with an increase in the drive current $I_{SLU}$. However, the slip control pressure $P_{SLU}$ may increase with a decrease in the drive current $I_{SLU}$. In this case, the drive current $I_{SLU}$ to be applied to the linear solenoid valve 54 is decreased to increase the slip control pressure $P_{SLU}$. Alternatively, the slip control valve 56 may be modified such that the amount of slip $N_{slip}$ of the lock-up clutch 32 increases with an increase in the slip control pressure $P_{SLU}$.

In the embodiment of FIGS. 10A and 10B, the drive current $I_{SLU}$ is initially set to the relatively high level $SLU_{ST}$ to initially increase the engaging force of the lock-up clutch during a shifting action of the transmission 14, and is then lowered to the relatively low level $SLU_{FWD}$ to reduce the engaging force of the lock-up clutch 32 for a relatively short period before the completion of the shifting action which is followed by the deceleration slip control of the lock-up clutch 32. However, the deceleration slip control may be initiated during the shifting action of the transmission 14. In this case, the engaging force of the lock-up clutch 32 is first increased and then lowered before the completion of the shifting action, by suitably changing the target slip speed $N_{slipT}$.

In the embodiment of FIGS. 10A and 10B, step S19 is implemented to effect the deceleration slip control when the negative decision (NO) is obtained in step S18, namely, after the shifting action of the transmission 14 is completed. Step S19 may be followed by steps of determining whether the actual slip speed $N_{slip}$ of the lock-up clutch 32 has reached the target slip speed $N_{slipT}$ for a predetermined length of time, and indicating that the lock-up clutch 32 has failed to initiate partial engagement, if the target slip speed $N_{slipT}$ has not been reached within the predetermined length of time.

The embodiment of FIGS. 14A and 14B is adapted to monitor in steps SA8–SA10 the amplitude and frequency of the pulsations of the rate of change $dN_{out}/dt$ of the output speed $N_{out}$ of the transmission 14. However, the amplitude and frequency of the pulsations of the output speed $N_{out}$ may be monitored.

Although the power transmitting system to which the illustrated embodiments are applied uses the torque converter 12 equipped with the lock-up clutch 32, the present invention is also applicable to a power transmitting system using a fluid coupling equipped with the lock-up clutch 32.

It is to be understood that the present invention may be embodied with various other changes, modifications and improvements, which may occur to those skilled in the art, without departing from the spirit and scope of the invention defined in the following claims.

What is claimed is:

1. An apparatus for controlling an amount of slip of a lock-up clutch disposed between an engine and an automatic transmission of a motor vehicle for direct connection of the engine and the transmission, comprising:

slip control means for controlling a slip control pressure to be applied to said lock-up clutch such that the amount of slip of the lock-up clutch is held within a predetermined range while the vehicle is decelerating;

shift detecting means for detecting that said automatic transmission is in the process of a shifting action during deceleration of the vehicle; and pressure changing means responsive to detection of a shifting action of said transmission by said shift detecting means, for commanding said slip control means to change said slip control pressure a predetermined time prior to completion of said shifting action, for reducing an engaging force of said lock-up clutch to a first value lower than a second value corresponding to the amount of slip of the lock-up clutch established by said slip control means when the transmission is not in the process of a shifting action, whereby a shifting shock of the transmission is reduced by the reduced engaging force of the lock-up clutch.

2. An apparatus according to claim 1, wherein said slip control means includes a linear solenoid valve having a solenoid coil and generating said slip control pressure such that said slip control pressure changes with a drive current applied to said coil.

3. An apparatus according to claim 2, wherein said pressure changing means includes means for changing said drive current applied to said coil of said linear solenoid valve, to change said slip control pressure to reduce said engaging force of said lock-up clutch.

4. An apparatus according to claim 1, wherein said pressure changing means commands said slip control means to hold said slip control pressure at a level corresponding to said first value of the engaging force of said lock-up clutch, for a predetermined period of time which precedes the completion of said shifting action of the transmission.

5. An apparatus according to claim 1, further comprising deceleration detecting means for detecting deceleration of the vehicle, and wherein said pressure changing means commands said slip control means upon detection of the deceleration of the vehicle, to hold said slip control pressure at a predetermined level so that said engaging force of said lock-up clutch is held at a third value higher than said first and second values.

6. An apparatus according to claim 5, wherein said pressure changing means commands said slip control means to change said slip control pressure to reduce said engaging force of said lock-up clutch from said third value to said first value.

7. An apparatus according to claim 5, wherein said deceleration detecting means detects deceleration of the vehicle when a currently detected load acting on said engine is substantially zero while said vehicle is running.

8. An apparatus according to claim 7, wherein said deceleration detecting means detects deceleration of the vehicle when an accelerator pedal is returned from an operated position to a non-operated position thereof.

9. An apparatus according to claim 1, further comprising:
monitoring means for monitoring a variation in an output speed of said automatic transmission after completion of the shifting action; and
adjusting means for adjusting, on the basis of said variation monitored by said monitoring means, at least one parameter associated with a level of said slip control pressure which corresponds to said first value of said engaging force of the lock-up clutch.

10. An apparatus according to claim 9, wherein said at least one parameter is selected from the group consisting of: said level of said slip control pressure corresponding to said first value of the engaging force of said lock-up clutch; a point of time at which said slip control pressure is changed to said level corresponding to said first value of said engaging force; and a time duration for which said slip control pressure is held at said level corresponding to said first value of said engaging force.

11. An apparatus according to claim 9, wherein said monitoring means detects an amplitude of pulsations of a wave representative of a variation in said output speed of said transmission.

12. An apparatus according to claim 9, wherein said monitoring means detects a frequency of pulsations of a wave representative of a variation in said output speed of said transmission.

13. An apparatus according to claim 1, wherein said automatic transmission is shifted on the basis of a currently detected load of said engine and a running speed of the vehicle, and wherein said slip control means is operated to control the amount of slip of said lock-up clutch when said currently detected load and said running speed fall within a predetermined region in which said lock-up clutch should be controlled for partial engagement in a slip control mode.

* * * * *